(12) United States Patent
Yabe et al.

(10) Patent No.: US 10,131,170 B2
(45) Date of Patent: Nov. 20, 2018

(54) PROTECTIVE LAYER TRANSFER SHEET

(71) Applicant: Dai Nippon Printing Co., Ltd., Tokyo (JP)

(72) Inventors: Suguru Yabe, Tokyo (JP); Tomohiro Harada, Tokyo (JP); Kazumasa Maeda, Tokyo (JP); Munenori Ieshige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/667,730

(22) Filed: Aug. 3, 2017

(65) Prior Publication Data

US 2017/0326848 A1    Nov. 16, 2017

Related U.S. Application Data

(63) Continuation of application No. 14/917,409, filed as application No. PCT/JP2014/074870 on Sep. 19, 2014, now Pat. No. 9,764,579.

(30) Foreign Application Priority Data

Sep. 30, 2013   (JP) .................................. 2013-205773
Sep. 30, 2013   (JP) .................................. 2013-205830

(51) Int. Cl.
   *B41M 5/382*       (2006.01)
   *B32B 27/18*       (2006.01)
   (Continued)

(52) U.S. Cl.
   CPC ........... *B41M 5/38214* (2013.01); *B32B 7/00* (2013.01); *B32B 7/02* (2013.01); *B32B 7/04* (2013.01);
   (Continued)

(58) Field of Classification Search
   CPC .......... B41M 5/38214; B41M 2205/06; B41M 2205/30; B41M 2205/40
   (Continued)

(56) References Cited

U.S. PATENT DOCUMENTS

2003/0006696 A1    1/2003  Ito et al.
2003/0236318 A1    12/2003 Kitano
   (Continued)

FOREIGN PATENT DOCUMENTS

JP       03-207694 A1     9/1991
JP       10-297192 A1    11/1998
   (Continued)

OTHER PUBLICATIONS

International Search Report and Written Opinion (Application No. PCT/JP2014/074870) dated Dec. 16, 2014.

*Primary Examiner* — Bruce H Hess
(74) *Attorney, Agent, or Firm* — Burr & Brown, PLLC

(57) ABSTRACT

The present invention aims principally to provide a protective layer transfer sheet that can prevent occurrence of fusion between a receiving layer and a transfer layer and occurrence of peeling traces when the transfer layer is peeled from the receiving layer, even in the case that thermal energy applied on transfer of the transfer layer is increased and can obtain a high quality printed article and to provide a protective layer transfer sheet that can impart extremely good scratch resistance to the surface of a printed article. The protective layer transfer sheet includes a substrate, and a transfer layer provided on a surface of the substrate, and the transfer layer includes a binder resin and one or more substances selected from the group consisting of phosphoric acid esters, olefin-maleic acid copolymers, and amino polyether-modified silicone oils.

6 Claims, 1 Drawing Sheet

(51) Int. Cl.

| | | |
|---|---|---|
| B41M 7/00 | (2006.01) | |
| B32B 7/06 | (2006.01) | |
| B32B 27/08 | (2006.01) | |
| B32B 27/30 | (2006.01) | |
| B32B 27/36 | (2006.01) | |
| B32B 7/00 | (2006.01) | |
| B32B 7/02 | (2006.01) | |
| B32B 7/04 | (2006.01) | |
| B32B 7/10 | (2006.01) | |
| B32B 7/12 | (2006.01) | |
| B32B 27/00 | (2006.01) | |
| B32B 27/06 | (2006.01) | |
| B32B 27/20 | (2006.01) | |
| B32B 27/22 | (2006.01) | |
| B32B 27/28 | (2006.01) | |
| B32B 27/32 | (2006.01) | |

(52) U.S. Cl.
CPC .............. *B32B 7/06* (2013.01); *B32B 7/10* (2013.01); *B32B 7/12* (2013.01); *B32B 27/00* (2013.01); *B32B 27/06* (2013.01); *B32B 27/08* (2013.01); *B32B 27/18* (2013.01); *B32B 27/20* (2013.01); *B32B 27/22* (2013.01); *B32B 27/28* (2013.01); *B32B 27/286* (2013.01); *B32B 27/30* (2013.01); *B32B 27/302* (2013.01); *B32B 27/308* (2013.01); *B32B 27/32* (2013.01); *B32B 27/36* (2013.01); *B41M 7/0027* (2013.01); *B32B 2250/00* (2013.01); *B32B 2264/00* (2013.01); *B32B 2264/10* (2013.01); *B32B 2307/30* (2013.01); *B32B 2307/306* (2013.01); *B32B 2307/308* (2013.01); *B32B 2307/50* (2013.01); *B32B 2307/584* (2013.01); *B32B 2307/732* (2013.01); *B32B 2307/748* (2013.01); *B32B 2307/75* (2013.01); *B32B 2451/00* (2013.01); *B32B 2554/00* (2013.01); *B32B 2571/00* (2013.01); *B41M 2205/06* (2013.01); *B41M 2205/30* (2013.01); *B41M 2205/40* (2013.01)

(58) Field of Classification Search
USPC .......................................................... 28/32.6
See application file for complete search history.

(56) References Cited

U.S. PATENT DOCUMENTS

| 2005/0062394 A1 | 3/2005 | Ito et al. |
| 2014/0267535 A1 | 9/2014 | Yoneyama et al. |
| 2016/0221376 A1 | 8/2016 | Yabe |

FOREIGN PATENT DOCUMENTS

| JP | 2001-291469 A1 | 10/2001 |
| JP | 2005-096099 A1 | 4/2005 |
| JP | 2008-018645 A1 | 1/2008 |
| JP | 2008-238525 A1 | 10/2008 |
| JP | 2013-075480 A1 | 4/2013 |
| JP | 2013-082212 A1 | 5/2013 |

PROTECTIVE LAYER TRANSFER SHEET

CROSS-REFERENCE TO RELATED APPLICATIONS

This application is a Continuation of U.S. application Ser. No. 14/917,409, filed Mar. 8, 2016, which in turn is a National Stage of PCT/JP2014/074870, filed Sep. 19, 2014, the entireties of which are incorporated herein by reference.

BACKGROUND OF THE INVENTION

1. Field of the Invention

The present invention relates to a protective layer transfer sheet.

2. Description of Related Art

A sublimation thermal transfer method has been widely used for forming thermal transfer images since it can easily provide high-quality images of excellent transparency, and high reproducibility and high gradation of neutral tints, which are equivalent to the conventional full-color photographic images. The sublimation thermal transfer method is a method in which a thermal transfer sheet that has a dye layer provided on one surface of a substrate and a thermal transfer receiving sheet that has a receiving layer provided on one surface of another substrate or an intermediate transfer medium that has a receiving layer provided on one surface of another substrate so as to be peelable from the another substrate are used in combination to form a thermal transfer image by applying heat from the back face of the thermal transfer sheet to displace color materials contained in the dye layer onto the receiving layer (for example, Patent Literature 1 and Patent Literature 2). Incidentally, with respect to the thermal transfer receiving sheet, a printed article is obtained by forming a thermally transferred image on the receiving layer, and with respect to the intermediate transfer medium, a printed article is obtained by forming a thermally transferred image on the receiving layer followed by transferring the receiving layer on which the thermally transferred image is formed onto an optional transfer receiving article.

Incidentally, although a thermally transferred image formed on the receiving layer by the sublimation thermal transfer method excels in gradation, the receiving layer on which the thermally transferred image has been formed is located on the outermost surface of the printed article, and thus, there is a problem of inferior durability of the thermally transferred image.

In view of the above mentioned circumstances, attempts have been widely made to obtain a printed article in which a protective layer is further provided on a receiving layer by transferring the protective layer on the receiving layer on which a thermally transferred image has been formed using a protective layer transfer sheet that has a substrate and a protective layer peelably provided on the substrate (may be referred to as a transfer layer) (for example, Patent Literature 3). According to the printed article on which the protective layer has been transferred, since the protective layer has been provided on the receiving layer, it is possible to improve the durability of the thermally transferred image formed on the receiving layer.

Recently, there have been many needs to obtain not only printed articles having a glossy appearance, but also printed articles having matte and semi-glossy appearances. It is possible to obtain such printed articles having glossy, matte, or semi-glossy appearance by adjusting thermal energy applied when the protective layer of a protective layer transfer sheet is transferred onto a receiving layer on which a thermally transferred image has been formed. It is possible to obtain a matte printed article, for example, by increasing thermal energy applied upon transfer of the protective layer, concretely, by applying thermal energy which causes cohesive failure in the binder resin contained in the protective layer upon thermal transfer of the protective layer. Meanwhile, it is possible to obtain a printed article having a glossy appearance by reducing thermal energy applied upon transfer of the protective layer, concretely, by applying thermal energy which does not cause cohesive failure in the binder resin contained in the protective layer on thermal transfer of the protective layer. In addition, it is possible to obtain a printed article in which a matte tone and a glossy tone are mixed, that is, a printed article having a semi-glossy appearance, by changing thermal energy applied on transfer of the protective layer on the region basis.

Incidentally, in the case of transferring a protective layer on a receiving layer on which a thermally transferred image has been formed using a protective layer transfer sheet, transfer is conducted with the receiving layer and the protective layer in close contact. If releasability of the protective layer is low, the receiving layer on which a thermally transferred image has been formed fuses with the protective layer on transfer of the protective layer, and the protective layer transfer sheet may break in the protective layer portion, or peeling traces may occur on the protective layer on peeling of the protective layer from the receiving layer. This leads to a problem of deteriorated print quality of a printed article after transfer of the protective layer. In particular, to obtain a printed article having a matte appearance, it is necessary to apply extremely high thermal energy, and thus, problems of the above fusion and peeling traces are more likely to occur.

Further, a printed article having a protective layer provided on the receiving layer is generally formed by superposing the protective layer of the protective layer transfer sheet on the receiving layer of the thermal transfer receiving sheet (the receiving layer of the above mentioned printed article) followed by applying thermal energy on the back face of the protective layer transfer sheet with heating devices such as the thermal head possessed by a printer to thereby transfer the protective layer on the receiving layer. Then, the printed article after the protective layer has been provided on the receiving layer is discharged through the conveying route in the printer to the discharge port. Here, in the case that a low scratch-resistant protective layer has been transferred on the receiving layer, there is a problem of impairing an aesthetic appearance of a printed article while the article is discharged through the conveying route to the discharge port due to various factors, such as contact with a conveying roller, which leads to scratches on the protective layer located on the outermost surface of the printed article. Conveying mechanisms of many printers are likely to scratch the protective layer. The need is high for a protective layer transfer sheet that has an excellently scratch-resistant protective layer.

Various studies of the protective layer transfer sheet having an excellently scratch-resistant protective layer have been made. For example, in the Patent Literature 4, a protective layer transfer sheet which has a protective layer comprising a composition formed by crosslinking a polyester resin with isocyanate has been proposed. However, the protective layer transfer sheet having a protective layer which has been proposed in the corresponding literature or protective layer transfer sheets having a protective layer which have been proposed so far have a certain effect on the scratch resistance, but it cannot be said that the scratch resistance under a severer circumstance is not perfect, and there is a room for improvement.

CITATION LIST

Patent Literature

Patent Literature 1: Japanese Patent Laid-Open No. 2013-75480
Patent Literature 2: Japanese Patent Laid-Open No. 2013-82212
Patent Literature 3: Japanese Patent Laid-Open No. 2008-238525
Patent Literature 4: Japanese Patent Laid-Open No. 2005-96099

SUMMARY OF THE INVENTION

Technical Problem

The present invention has been made in view of the above mentioned circumstances, and the present invention aims principally to provide a protective layer transfer sheet that can prevent occurrence of fusion between a receiving layer and a transfer layer and occurrence of peeling traces when the transfer layer is peeled from the receiving layer, even in the case that thermal energy applied on transfer of the transfer layer is increased, and can obtain a high quality printed article and to provide a protective layer transfer sheet that can impart extremely good scratch resistance to the surface of a printed article.

Solution to Problem

The present invention for solving the above-mentioned problems is a protective layer transfer sheet which comprises a substrate, and a transfer layer provided on a surface of the substrate; wherein a protective layer, which is nearest the substrate among layers constituting the transfer layer, comprises an acrylic resin having a glass transition temperature (Tg) of not less than 100° C. and talc.

In addition, the protective layer may comprise the talc in the range of not less than 2% by weight and not more than 10% by weight on the basis of the total weight of the solid content of the resin component contained in the protective layer, and the specific surface area of talc may be not more than 10 m²/g.

In addition, the protective layer may contain a copolymer of methyl methacrylate and styrene monomers in addition to the acrylic resin having a glass transition temperature (Tg) of not less than 100° C.

In addition, the present invention for solving the above-mentioned problems is a protective layer transfer sheet which comprises a substrate, and a transfer layer provided on a surface of the substrate; wherein a protective layer, which is nearest the substrate among layers constituting the transfer layer, contains an acrylic resin having a glass transition temperature (Tg) of not less than 100° C., talc, and one or more substances selected from the group of phosphoric acid esters, olefin-maleic acid copolymers, and amino polyether-modified silicone oils.

In addition, the present invention for solving the above-mentioned problems is a protective layer transfer sheet which comprises a substrate, and a transfer layer provided on a surface of the substrate; wherein the transfer layer contains a binder resin and one or more substances selected from the group of phosphoric acid esters, olefin-maleic acid copolymers, and amino polyether-modified silicone oils.

In addition, the transfer layer may contain one or more substances selected from the group of phosphoric acid esters, olefin-maleic acid copolymers, and amino polyether-modified silicone oils in the range of not less than 0.5% by weight and not more than 10% by weight on the basis of the total weight of the solid content of the binder resin.

In addition, the transfer layer takes a multi-layered structure, and a layer which is nearest the substrate 1 among layers constituting the transfer layer may contain the binder resin and one or more substances selected from the group of phosphoric acid esters, olefin-maleic acid copolymers, and amino polyether-modified silicone oils. In addition, the layer which is nearest the substrate may be the protective layer.

Advantageous Effects of Invention

According to the protective layer transfer sheet of one embodiment of the present invention, even in the case that thermal energy applied on transfer of the transfer layer is increased in order to obtain a printed article having a matte appearance, it is possible to prevent occurrence of fusion between the receiving layer and the transfer layer and occurrence of peeling traces when the transfer layer is peeled from the receiving layer and to obtain a high quality printed article. In addition, according to the protective layer transfer sheet of other embodiment of the present invention, it is possible to impart sufficient scratch resistance to the surface of a printed article, and it is possible to prevent occurrence of scratches on the printed article after the transfer layer has been transferred thereon, even in the case that the article is subjected to a severe circumstance.

DETAILED DESCRIPTION OF THE INVENTION

<<Protective Layer Transfer Sheet>>

Figure 1:
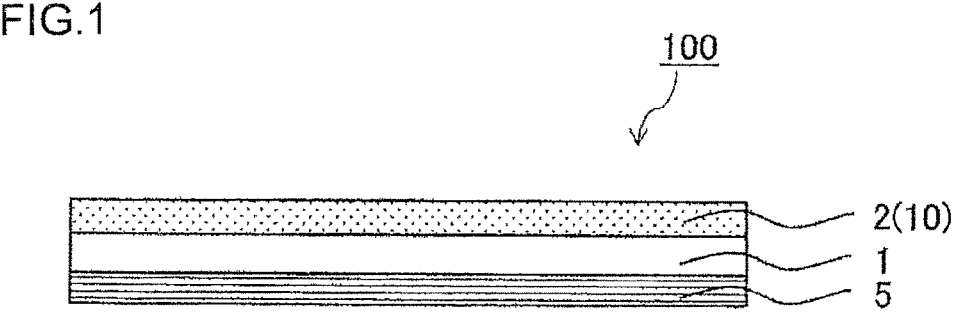
FIG. 1 is a schematic sectional view showing an example of the protective layer transfer sheet according to the present invention.
Figure 2:
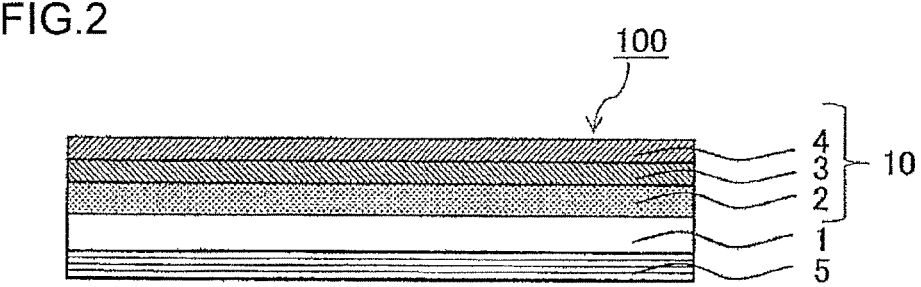
FIG. 2 is a schematic sectional view showing an example of the protective layer transfer sheet according to the present invention.

Now, the protective layer transfer sheet 100 of one embodiment according to the present invention will be described in detail. FIG. 1 is a schematic sectional view showing an example of the protective layer transfer sheet according to the present invention. As shown in FIGS. 1 and 2, the protective layer transfer sheet 100 of the present invention comprises a substrate 1, and a transfer layer 10 provided on a surface of the substrate 1. The transfer layer 10 may take a single layer structure, as shown in FIG. 1, or may take a multi-layered structure. For example, in the embodiment shown in FIG. 2, the transfer layer 10 takes a multi-layered structure in which a protective layer 2, a primer layer 3, and an adhesive layer 4 are layered in this order. Further, in FIGS. 1 and 2, an optional back face layer 5 is provided on the other surface of the substrate 1. The substrate 1 and the transfer layer 10 are essential components of the protective layer transfer sheet 100 of the present invention. Hereinafter, the components constituting the protective layer transfer sheet 100 of the present invention will be described in detail.

(Substrate)

The substrate 1 is an essential component of the protective layer transfer sheet 100 of the present invention, and is provided for the purpose of supporting the transfer layer 10, or an optional layer to be provided between the substrate 1 and the transfer layer 10, and a back face layer 5 which is optionally provided on the other surface of the substrate. With respect to the material for the substrate 1 there is no particular limitation, and it is desirable to be able to resist heat which is applied on thermal transfer of the transfer layer 10 onto a receiving layer, and to have a sufficient mechanical strength for handling without a hitch. As such a material for the substrate 1, various plastic films or sheets, for instance, including, polyesters such as polyethylene terephthalate, polyarylates, polycarbonates, polyurethanes, polyimides, polyether imides, cellulose derivatives, polyethylenes, ethylene-vinyl acetate copolymers, polypropylenes, polystyrenes, acryl, polyvinyl chlorides, polyvinylidene chlorides, polyvinyl alcohols, polyvinyl butyrals, nylons, polyether ether ketones, polysulfones, polyether sulfones, tetrafluoroethylene-perfluoroalkyl vinyl ethers, polyvinyl fluorides, tetrafluoroethylene-ethylenes, tetrafluoroethylene-hexafluoropropylenes, polychlorotrifluoroethylenes, polyvinylidene fluorides, etc. may be enumerated. The thickness of the substrate 1 can be appropriately selected depending on the kind of the material used so as to make it suitable in strength and heat resistance, the thickness is usually in the range of about 2.5 μm to about 100 μm.

(Transfer Layer)

As shown in FIG. 1, the transfer layer 10 is provided on a surface of the substrate 1. The transfer layer 10 is an essential component of the protective layer transfer sheet 100 of one embodiment, and is a layer which is peeled from substrate 1 and transferred onto a transfer receiving article such as a receiving layer on thermal transfer. Hereinafter, with respect to the transfer layer 10, the transfer layer of the first embodiment and the transfer layer of the second embodiment will be separately described in detail. Further, hereinafter, the protective layer transfer sheet comprising the transfer layer of the first embodiment will be described as "the protective layer transfer sheet of the first embodiment", and the thermal transfer sheet comprising the transfer layer of the second embodiment will be described as "the protective layer transfer sheet of the second embodiment".

<Transfer Layer of the First Embodiment>

The transfer layer 10 of the first embodiment may take a single layer structure as shown in FIG. 1, or may take a multi-layered structure in which two or more layers are layered as shown in FIG. 2.

The protective layer transfer sheet of the first embodiment is characterized in that any one of the layers constituting the transfer layer of the first embodiment contains a binder resin and one or more substances selected from the group of phosphoric acid esters, olefin-maleic acid copolymers, and amino polyether-modified silicone oils. Hereinafter, one or more substances selected from the group of phosphoric acid esters, olefin-maleic acid copolymers, and amino polyether-modified silicone oils may be collectively referred to as "specific releasing agents" occasionally.

In the protective layer transfer sheet of the first embodiment, in the case that the transfer layer 10 of the first embodiment takes a single layer structure, the layer contains a binder resin and a "specific releasing agent". In the case that the transfer layer 10 of the first embodiment takes a multi-layered structure, at least one layer constituting the transfer layer 10 of the first embodiment contains a binder resin and a "specific releasing agent". In other words, any one of the layers constituting the transfer layer of the first embodiment contains a binder resin and a "specific releasing agent".

In the case that the transfer layer 10 of the first embodiment takes a multi-layered structure, the layer which is nearest the substrate 1 among the layers constituting the transfer layer 10 of the first embodiment preferably contains a binder resin and a "specific releasing agent". The layer which is nearest the substrate 1 becomes a peeling interface on thermal transfer of the transfer layer 10 of the first embodiment, and thus, when the layer which is nearest the substrate 1 contains a binder resin and a "specific releasing agent", it is possible to improve the release property of the transfer layer 10 of the first embodiment from the substrate 1.

For example, as shown in FIG. 2, in the case that the transfer layer 100 of the first embodiment takes a multi-layered structure in which a protective layer 2, a primer layer 3, and an adhesive layer 4 are layered, the protective layer 2 will be nearest the substrate 1. Accordingly, in this case, the protective layer 2 preferably contains the above mentioned "specific releasing agent". Hereinafter, the example of the protective layer 2 containing the above mentioned "specific releasing agent" will be mainly described, but, for example, in a protective layer transfer sheet in which a peeling layer, a protective layer, and an adhesive layer are layered in this order, the peeling layer may contain the above mentioned "specific releasing agent". In this case, as the protective layer, a protective layer conventionally known in the field of the protective layer transfer sheet can be used by selecting appropriately. Incidentally, in the case that the transfer layer 10 of the first embodiment takes a single layer structure, as shown in FIG. 1, the protective layer 2 per se will be the transfer layer 10 as it is. Hereinafter, the case that the protective layer 2 constituting the transfer layer 10 of the first embodiment contains a binder resin and the above mentioned "specific releasing agent" will be mainly described. In addition, the protective layer constituting the transfer layer 10 of the first embodiment will be referred to as "the protective layer of the first embodiment".

<Binder Resin>

The transfer layer 10 of the first embodiment as one example includes the protective layer 2 of the first embodiment, and the protective layer 2 of the first embodiment contains a binder resin. With respect to the binder resin, there is no particular limitation, and a known resin as "the protective layer" or "the peeling layer" of the protective layer transfer sheet can be used by selecting appropriately. For example, as the binder resin in the protective layer 2 of the first embodiment, acrylic resins, vinyl chloride/vinyl acetate copolymers, polyester resins, polycarbonate resins, ultraviolet absorbing resins, epoxy resins, polystyrene resins, polyurethane resins, acrylic urethane resins, ionizing radiation-curable resins, and ultraviolet absorbing resins, etc., can be exemplified. As the ultraviolet absorbing resin, for instance, a resin which is prepared by reacting and linking a reactive ultraviolet absorbing agent with and to a thermoplastic resin or the ionizing radiation-curable resin mentioned above can be used. More concretely, those prepared by introducing a reactive group such as an addition-polymerizable double bond (for instance, a vinyl group, an acryloyl group, a methacryloyl group, etc.), an alcoholic hydroxyl group, an amino group, a carboxyl group, an epoxy group, and an isocyanate group into a non-reactive organic ultraviolet absorbing agent conventionally known in the art such as salicylate series, benzophenone series, benzotriazole series, substituted acrylonitrile series, nickel-chelate series, and hindered amine series can be exemplified. These resins can be used singly, or two or more of the resin may be used in combination.

Among the resin exemplified above, an acrylic resin is suitable as the binder resin contained in the protective layer 2 of the first embodiment, from the viewpoint that the acrylic resin can impart good matte texture to the printed article on which the transfer layer of the first embodiment has been transferred as well as can improve the durability of the protective layer 2 of the first embodiment when thermal energy applied on thermal transfer of transfer layer of the first embodiment is increased. The acrylic resin used herein includes polymers of acrylic acid or methacrylic acid monomers or derivatives thereof, polymers of acrylic acid ester or methacrylic acid ester monomers or derivatives thereof, copolymers of acrylic acid or methacrylic acid monomers with other monomers or derivatives thereof, and copolymers of acrylic acid ester or methacrylic acid ester monomers with other monomers or derivatives thereof.

As the acrylic acid ester or methacrylic acid ester monomers, for example, alkyl acrylates, alkyl methacrylates, etc. can be enumerated. Concretely, methyl acrylate, methyl methacrylate, ethyl acrylate, ethyl methacrylate, butyl acrylate, butyl methacrylate, lauryl acrylate, lauryl methacrylate, 2-hydroxyethyl acrylate, 2-hydroxyethyl methacrylate, 2-hydroxybutyl acrylate, 2-hydroxybutyl methacrylate, 2-hydroxy-3-phenoxypropyl acrylate, 2-hydroxy-3-phenoxypropyl methacrylate, etc. can be enumerated.

As the other monomers, for example, aromatic hydrocarbons, aryl group-containing compounds, amide group-containing compounds, vinyl chloride, etc., styrene, benzyl styrene, phenoxyethyl methacrylate, acrylamide and methacrylamide, etc. can be enumerated.

In addition, as the acrylic resin, it is also possible to use an acrylic polyol resin obtained by copolymerizing one or more acrylic acid alkyl esters, one or more (meth)acrylic acid esters having a hydroxyl group in the molecule, such as 2-hydroxyethyl (meth)acrylate, 2-hydroxybutyl (meth)acrylate, and 2-hydroxy-3-phenoxypropyl (meth)acrylate, and, as required, one or more other polymerizable polymers such as styrene.

Further, the glass transition temperature (Tg) of the binder resin contained in the protective layer 2 of the first embodiment is preferably not less than 20° C. and not more than 130° C., more preferably not less than 80° C. and not more than 130° C. When the protective layer 2 of the first embodiment contains a binder resin having a glass transition temperature (Tg) in this range, it is possible to optimize the release property of the transfer layer 10 of the first embodiment from the substrate and to improve the durability of the printed article on which the transfer layer 10 of the first embodiment has been transferred. Further, it is possible to improve the foil tearing property of the transfer layer of the first embodiment on thermal transfer. Incidentally, the glass transition temperature used herein denotes a temperature of degree Celsius (° C.) that is converted from a temperature (degree Kelvin) obtained by calculating in accordance with the Fox theoretical equation.

Further, the acid value (mgKOH/g) of the binder resin contained in the protective layer 2 of the first embodiment is preferably not less than 5 and not more than 55, more preferably not less than 10 and not more than 50. In the case that the protective layer 2 of the first embodiment contains only a binder resin having an acid value (mgKOH/g) of more than 55, the adhesiveness between the substrate 1 or an optional layer provided between the substrate 1 and the transfer layer 10 of the first embodiment heightens excessively, and peeling failure of the transfer layer of the first embodiment on thermal transfer tends to occur. Meanwhile, when the protective layer 2 of the first embodiment contains only a binder resin having an acid value (mgKOH/g) of less than 5, the adhesiveness between the substrate 1 or an optional layer provided between the substrate 1 and the transfer layer 10 of the first embodiment is lowered excessively, and problems such as abnormal transfer of the transfer layer of the first embodiment on thermal transfer tend to occur. Incidentally, the acid value (mgKOH/g) used herein denotes the number in mg of potassium hydroxide required to neutralize one gram of the solid content of the binder resin.

<Specific Releasing Agent>

In the transfer layer 10 of the first embodiment as one example, the protective layer 2 of the first embodiment constituting the transfer layer 10 of the first embodiment contains one or more substances selected from the group of phosphoric acid esters, olefin-maleic acid copolymers, and amino polyether-modified silicone oils as the "specific releasing agent" in addition to the above mentioned binder resin.

In addition to aiming to improve the release property of the transfer layer 10 of the first embodiment from substrate 1, the "specific releasing agent" aims to improve the releasability of the transfer layer 10 of the first embodiment from the receiving layer on thermal transfer. Concretely, in order to obtain a matte printed article by using a protective layer transfer sheet, it is necessary to increase thermal energy applied on thermal transfer of the transfer layer of the first embodiment to the extent that cohesive failure in the above mentioned "binder resin" occurs. As the thermal energy applied on thermal transfer of the transfer layer of the first embodiment heightens, the releasability of the transfer layer of the first embodiment from the receiving layer becomes heavier. Here, in the case that the transfer layer of the first embodiment contains no "specific releasing agent" as the releasing agent or contains only a releasing agent other than the "specific releasing agent", the receiving layer and the transfer layer of the first embodiment adhere to each other, or peeling traces occur on the transfer layer of the first embodiment when the transfer layer of the first embodiment is peeled from the receiving layer. In addition, when the releasability becomes heavier, the transfer layer of the first embodiment is prone to break, and it is impossible to form a high quality printed article having a matte appearance.

In the transfer layer 10 of the first embodiment as one example, since the protective layer 2 of the first embodiment constituting the transfer layer 10 of the first embodiment contains the "specific releasing agent", it is possible to provide a good release property of the transfer layer 10 of the first embodiment from the substrate 1 and good releasability of the transfer layer 10 of the first embodiment from the receiving layer on thermal transfer, and thus, it is possible to obtain a high quality printed article having excellent durability. In particular, even in the case that the thermal energy applied on thermal transfer is increased in order to obtain a matte appearance, it is possible to prevent adhesion between the receiving layer and the transfer layer of the first embodiment and occurrence of peeling traces, and thus, it is possible to obtain a high quality matte printed article having excellent durability. Incidentally, in the case that the protective layer 2 of the first embodiment contains other releasing agent instead of the "specific releasing agent", it is impossible to satisfy the releasability, and the above mentioned problem will occur.

"Phosphoric Acid Ester"

The phosphoric acid ester used herein means an ester formed by dehydration condensation of phosphoric acid and an alcohol, among organic phosphorous compounds. As the phosphoric acid ester, for example, (1) phosphoric acid monoesters or diesters of saturated or unsaturated higher alcohols having 6 to 20 carbon atoms, (2) phosphoric acid monoesters or diesters of polyoxyalkylene alkyl ethers or polyoxyalkylene alkylallyl ethers, (3) phosphoric acid monoesters or diesters of alkylene oxide adducts (average number of moles added 1 to 8) of the above mentioned saturated or unsaturated higher alcohols, (4) phosphoric acid monoesters or diesters of alkyl phenols or alkyl naphthols having 8 to 12 carbon atoms, etc. can be enumerated. As the saturated or unsaturated higher alcohols in the above mentioned (1) and (3), for example, cetyl alcohol, stearyl alcohol, oleyl alcohol, etc. can be enumerated. As the alkyl phenols in the above mentioned (3), nonyl phenol, dodecyl phenol, diphenyl phenol etc. can be enumerated. The coating liquid of the present invention may contain only one phosphoric acid ester or may contain two or more phosphoric acid esters.

Concretely, phosphoric acid diesters represented by the following general formula (1), phosphoric acid monoesters represented by the general formula (2), or mixtures thereof can be exemplified.

[Formula 1]

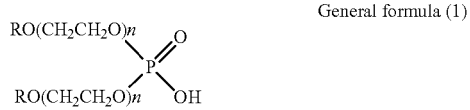

General formula (1)

(wherein, R is an alkyl group having 1 to 6 carbon atoms, and n is from 1 to 6.)

[Formula 2]

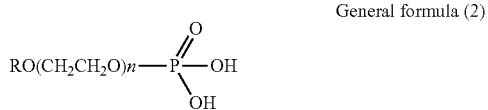

General formula (2)

(wherein, R is an alkyl group having 1 to 6 carbon atoms, and n is from 1 to 12.)

Among the phosphoric acid esters exemplified above, polyoxyethylene alkyl (C12, 13) ether phosphoric acid esters can be preferably used, from the viewpoints of having particularly good releasability and of having a property of being unlikely to cause reduction in the foil tearing property and in the durability of the protective layer 2 of the first embodiment.

"Olefin-Maleic Acid Copolymer"

An olefin-maleic acid copolymer is a copolymer of olefin monomers and maleic acid monomers. The olefin-maleic acid copolymer may be any one of random copolymers, block polymers, graft copolymers, or the like. Further, the olefin-maleic acid copolymer may contain another monomer, a substituent, a substituting group, or the like, in addition to olefin monomers and maleic acid monomers.

As the olefin-maleic acid copolymer, those having a number average molecular weight (Mn) of not less than 12000 and not more than 20000 can be suitably used. The number average molecular weight (Mn) used herein is a polystyrene-converted molecular weight measured by the gel permeation chromatography (GPC).

"Amino Polyether-Modified Silicone Oil"

Amino polyether-modified silicone oils are silicone oils formed by introducing an amino group and a polyether group into polysiloxane. Amino polyether-modified silicone oils may be dual-end type silicone oils formed by introducing an amino group into one end of polysiloxane or a polyether group into the other end and side-chain type silicone oils formed by introducing an amino group and a polyether group into the side chains of polysiloxane. The amino polyether-modified silicone oil may also take other forms.

As the amino polyether-modified silicone oil, those having a viscosity at 25° C. of not less than 3000 mm$^2$/s and not more than 10000 mm$^2$/s can be suitably used.

With respect to the content of the "specific releasing agent", there is no particular limitation. When the solid content of the binder resin contained in the protective layer of the first embodiment is taken as 100% by weight, the "specific releasing agent" is preferably contained in the range of not less than 0.5% by weight and not more than 10% by weight, the "specific releasing agent" is more preferably contained in the range of not less than 0.5% by weight and not more than 9% by weight, and the "specific releasing agent" is particularly preferably contained in the range of not less than 0.8% by weight and not more than 5% by weight. In the case that the content of the "specific releasing agent" is less than 0.5% by weight, the releasability of the transfer layer 10 of the first embodiment tends to decrease. In contrast, when the content exceeds 10% by weight, the durability, in particular, the plasticizer resistance, which is one of the chemical durability, of the protective layer 2 of the first embodiment tends to decrease.

In the case that the transfer layer 10 of the first embodiment takes a single layer structure, the protective layer 2 of the first embodiment preferably contains a binder resin having adhesiveness to a receiving layer. As the binder resin having adhesiveness to a receiving layer, for example, conventionally known adhesive resins that include an acrylic resin, a vinyl type resin, a polyester type resin, an urethane type resin, a polyamide type resin, an epoxy type resin, a rubber type resin, an ionomer resin, or the like as a main component can be enumerated.

(Other Optional Components)

The protective layer 2 of the first embodiment may contain other optional components in addition to the above mentioned binder resin and the "specific releasing agent". For example, various silicone oils, polyethylene waxes; metal soaps such as zinc stearate, zinc stearyl phosphate, calcium stearate, and magnesium stearate; fatty acid amides; releasing agents such as polyethylene waxes, carnauba waxes, paraffin waxes; known ultraviolet absorbing agents such as benzophenone series, benzotriazole series, benzoate series, triazine series, titanium oxide, zinc oxide; light stabilizers such as hindered amine type, Ni chelate type; antioxidants such as hindered phenol type, sulfur type, phosphorus type, lactone type, etc. can be enumerated. These optional components may be used singly, or two or more of them can be used in combination.

With respect to the method for forming the protective layer 2 of the first embodiment, there is no particular limitation. The protective layer 2 can be formed by preparing a coating liquid for protective layer where a binder resin, a "specific releasing agent", and optional components added as necessary are dissolved or dispersed in an appropriate solvent, coating the substrate 1 or a layer optionally provided on the substrate 1 with the coating liquid for protective layer in accordance with a known coating procedure such as the gravure printing method, the screen printing method, and the reverse roll coating printing method by use of a gravure plate, and then drying the coating solution.

With respect to the thickness of the protective layer 2 of the first embodiment, there is no particular limitation, and the thickness is preferably in the range of not less than 0.5 μm and not more than 10 μm.

(Adhesive Layer)

As shown in FIG. 2, an adhesive layer 4 may be provided on the protective layer 2 of the first embodiment. The adhesive layer 4 is an optional layer constituting the transfer layer 10 of the first embodiment, and may be referred to as a "heat seal layer" in some cases.

With respect to the binder resin constituting the adhesive layer 4, there is no particular limitation, a conventionally known resin as the adhesive layer of the protective layer transfer sheet can be used by selecting appropriately. For example, as the binder resin of the adhesive layer 4, ultraviolet absorbing agent copolymer resins, acrylic resins, vinyl chloride-vinyl acetate copolymer resins, epoxy resins, polyester resins, polycarbonate resins, butyral resins, polyamide resins, vinyl chloride resins, etc. can be enumerated.

With respect to the method for forming the adhesive layer 4, the adhesive layer can be formed by preparing a coating liquid for adhesive layer where the binder resin exemplified above and an ultraviolet absorbing agent, an antioxidant, a fluorescent whitening agent, an inorganic or organic filler component, a surfactant, a releasing agent, etc. added as required, are dispersed or dissolved in an appropriate solvent, coating the protective layer 2 of the first embodiment with this liquid by a method such as the gravure coating, the gravure reverse coating, and drying the coating liquid. With respect to the thickness of the adhesive layer, there is no particular limitation, and the thickness is preferably from about 0.5 μm to about 10 μm, more preferably from about 0.8 μm to about 2.0 μm.

(Primer Layer)

As shown in FIG. 2, the primer layer 3 may be provided between the protective layer 2 of the first embodiment and the adhesive layer 4. The primer layer 3 is an optional layer constituting the transfer layer 10 of the first embodiment. When the primer layer is provided, it is possible to provide good adhesiveness between the protective layer 2 of the first embodiment and the adhesive layer 4. As the materials for the primer layer, polyester type resins, polyvinylpyrrolidone resins, polyvinyl alcohol resins, hydroxyethylcelluloses, polyacrylic acid ester type resins, polyvinyl acetate type resins, polyurethane type resins, styrene acrylate type resins, polyacrylamide type resins, polyamide type resins, polyether type resins, polystyrene type resins, polyethylene type resins, polypropylene type resins, polyvinyl chloride resins, polyvinyl acetal type resins such as polyvinyl acetoacetal, polyvinyl butyral, etc. can be enumerated.

In addition, the primer layer may contain colloidal inorganic pigment ultrafine particles. As the colloidal inorganic pigment ultrafine particles, for example, silica (colloidal silica), alumina or alumina hydrates (alumina sols, colloidal alumina, cationic aluminum oxide or hydrates thereof, pseudo-boehmite, etc.), aluminum silicate, magnesium silicate, magnesium carbonate, magnesium oxide, titanium oxide, etc. can be enumerated. In particular, colloidal silica and alumina sols are preferably used. It is preferable to use these colloidal inorganic pigment ultrafine particles having a primary average particle size of not more than 100 nm, preferably of not more than 50 nm.

(Plasticizer Resistive Layer)

In addition, a plasticizer resistive layer (not shown) may be provided between the protective layer 2 of the first embodiment and the adhesive layer 4. The plasticizer resistive layer is an optional layer constituting the transfer layer 10 of the first embodiment. As the plasticizer resistive layer, materials which repel the plasticizer component, or materials which give the plasticizer component difficulties in reaching the thermally transferred image formed on a receiving layer can be preferably used. As materials which repel the plasticizer component, polyvinyl alcohol resins, polyvinyl butyral resins, polyvinyl acetal resins, polyvinylpyrrolidone resins can be enumerated. As the materials which give the plasticizer component difficulties in reaching the thermally transferred image, cationic resins such as cationic urethane emulsion etc. can be enumerated. These materials may be used solely on an individual basis, or may be used as a mixture of two or more of them in combination.

In addition, the polyvinyl alcohol resins, polyvinyl butyral resins, and polyvinyl acetal resins exemplified as the material which repels the plasticizer component, preferably have a saponification degree of 30 to 100%, more preferably of 60 to 100%. When the plasticizer resistive layer contains a polyvinyl alcohol resin, a polyvinyl butyral resin, or a polyvinyl acetal resin having a saponification degree in this range, it is possible to further improve the plasticizer resistance of the transfer layer. Incidentally, the saponification degree used herein refers to the value obtained by dividing the number of moles of the vinyl alcohol structure in the polymer by the number of moles of all monomers in the polymer. The materials which repel the plasticizer component or the material which give the plasticizer component difficulties in reaching the image is preferably contained within the range of 20% by weight to 100% by weight on the basis of the total solid content of the plasticizer resistive layer.

In addition, for example, a lubricant, a plasticizer, a filler, an antistatic agent, an anti-blocking agent, a cross-linking agent, an antioxidant, an ultraviolet absorbing agent, a light stabilizer, a colorant such as a dye and a pigment, a fluorescent whitening agent, other additives, etc. may be added to the plasticizer resistive layer, as required. In addition, the "specific releasing agent" described above may be added.

The plasticizer resistive layer provided as required can be formed by preparing a coating liquid for plasticizer resistive layer where one or more of the materials exemplified above and various materials to be added as required are dissolved or dispersed in an appropriate solvent, coating the substrate 1 or the protective layer 2 of the first embodiment with this liquid, and drying the coating liquid. With respect to the thickness of the plasticizer resistive layer, there is no particular limitation, and the thickness after drying is usually from 0.1 μm to 50 preferably from about 1 μm to about 20 μm.

In addition, a release layer (not shown) may be provided between the substrate 1 and the transfer layer 10 of the first embodiment, that is, between the substrate 1 and the protective layer 2 of the first embodiment. The release layer is a layer not constituting the transfer layer 10 of the first embodiment and remaining on the substrate 1 side on transfer of the transfer layer 10 of the first embodiment. When the release layer is provided, it is possible to provide a good release property of the transfer layer 10 of the first embodiment from the substrate 1 on transfer of the transfer layer 10 of the first embodiment.

As the resin forming the release layer, any conventionally known resin having excellent releasability can be used, and for example, waxes, silicone waxes, silicone resins, silicone-modified resins, fluorine-contained resins, fluorine-modified resins, polyvinyl alcohol, acrylic resins, acrylic-styrene type resins, thermally-crosslinkable epoxy-amino resins, thermally-crosslinkable alkyd-amino resins, etc. can be enumerated. These releasable resins can be used singly or as a mixture. It is also possible to form the release layer by using a cross-linking agent such as isocyanate compounds and a catalyst such as tin-based catalysts, aluminum-based catalysts in combination with the resin having excellent releasability. The thickness of the release layer is generally from about 0.5 µm to about 5 µm. As the method for forming the release layer, it is possible to form the release layer by preparing a coating liquid for release layer where the above mentioned resin is dissolved or dispersed in an appropriate solvent, coating the substrate 1 with this liquid in accordance with a conventionally known coating procedure such as the gravure printing method, the screen printing method, or the reverse coating printing method using a gravure plate, and then drying the coating solution.

<Transfer Layer of the Second Embodiment>

The transfer layer 10 of the second embodiment includes a protective layer 2 as an essential layer. Hereinafter, the protective layer constituting the transfer layer of the second embodiment will be referred to as "the protective layer of the second embodiment". Incidentally, unless otherwise indicated, when a protective layer is referred to, the protective layer of the first embodiment, the protective layer of the second embodiment, and the protective layer of the third embodiment described later are included. The transfer layer 10 of the second embodiment may take a single layer structure consisting only of the protective layer 2 of the second embodiment, as shown in FIG. 1, or may take a multi-layered structure in which two or more layers including the protective layer 2 of the second embodiment are layered such that the protective layer 2 of the second embodiment will be nearest the substrate 1, as shown in FIG. 2.

The protective layer 2 of the second embodiment is characterized of containing an acrylic resin having a glass transition temperature (Tg) of not less than 100° C. and talc. According to the protective layer transfer sheet of the second embodiment having this feature, it is possible to impart extremely good scratch resistance to the protective layer 2 of the second embodiment. Thereby, it is possible to impart extremely good scratch resistance to a printed article on which the transfer layer 10 of the second embodiment has been transferred. Concretely, it is possible to prevent the surface of the printed article from being scratched, while the printed article after the transfer layer 10 of the second embodiment has been transferred thereon is discharged through the conveying route in the printer or in the case that the printed article on which the transfer layer 10 of the second embodiment has been transferred is subjected to a severe circumstance.

In addition, since the acrylic resin having a glass transition temperature (Tg) of not less than 100° C. contained in the protective layer 2 of the second embodiment has a property of being excellently plasticizer resistant, it is possible to improve the plasticizer resistance of the protective layer 2 of the second embodiment. Incidentally, when the protective layer of the second embodiment contains an acrylic resin having a glass transition temperature (Tg) of less than 100° C. instead of the acrylic resin having a glass transition temperature (Tg) of not less than 100° C., it is impossible to sufficiently satisfy the scratch resistance, even if the talc described below is additionally contained. This is applied similarly to the case that the protective layer of the second embodiment contains other resin instead of the acrylic resin having a glass transition temperature (Tg) of not less than 100° C. For example, in the case that the protective layer of the second embodiment contains other resin having a glass transition temperature (Tg) of not less than 100° C. instead of the acrylic resin having a glass transition temperature (Tg) of not less than 100° C., it is impossible to make the scratch resistance of the protective layer sufficient and also to satisfy the plasticizer resistance, even if the talc described below is additionally contained.

As the acrylic resin contained in the protective layer of the second embodiment, the acrylic resin as described in the explanation of the above mentioned transfer layer of the first embodiment can be used by selecting appropriately, and thus, the detailed description thereof is omitted. Incidentally, as mentioned above, the acrylic resin contained in the protective layer of the second embodiment has an essential condition of having a glass transition temperature (Tg) of not less than 100° C.

The protective layer of the second embodiment preferably contains a copolymer of methyl methacrylate and other monomers as the acrylic resin having a glass transition temperature (Tg) of not less than 100° C. In particular, the protective layer 2 of the second embodiment preferably contains a copolymer of methyl methacrylate and any monomers of acrylic acid, methacrylic acid, or 2-hydroxyethyl methacrylate as the acrylic resin having a glass transition temperature (Tg) of not less than 100° C. According to the protective layer 2 of the second embodiment which contains a copolymer of methyl methacrylate and other monomers as the acrylic resin having a glass transition temperature (Tg) of not less than 100° C., a further improvement in the scratch resistance can be expected, as compared with the protective layer 2 of the second embodiment which contains other acrylic resin having a glass transition temperature (Tg) of not less than 100° C.

With respect to the content of the acrylic resin having a glass transition temperature (Tg) of not less than 100° C. on the basis of the total solid content of the protective layer 2 of the second embodiment, there is no particular limitation. In the case that the content of acrylic resin having a glass transition temperature (Tg) of not less than 100° C. is less than 50% by weight, there is a tendency that the plasticizer resistance of the protective layer 2 of the second embodiment becomes lower, and there may cause a case that it is impossible to impart sufficient plasticizer resistance to the printed article on which the transfer layer of the second embodiment including the protective layer of the second embodiment has been transferred. In consideration of this viewpoint, it is preferred that not less than 50% by weight of the acrylic resin having a glass transition temperature (Tg) of not less than 100° C. is contained on the basis of the total solid content of the protective layer 2 of the second embodiment.

In addition, the protective layer 2 of the second embodiment may contain other resin component in addition to the above mentioned acrylic resin having a glass transition temperature (Tg) of not less than 100° C. As the other resin component, vinyl chloride/vinyl acetate copolymers, polyester resins, polycarbonate resins, ultraviolet absorbing resins, epoxy resins, polystyrene resins, polyurethane resins, ionizing radiation-curable resins, ultraviolet absorbing resins, etc. can be enumerated. As the ultraviolet absorbing resin, for instance, a resin which is prepared by reacting and linking a reactive ultraviolet absorbing agent with and to a thermoplastic resin or the ionizing radiation-curable resin mentioned above can be used. More concretely, those prepared by introducing a reactive group such as an addition-polymerizable double bond (for instance, a vinyl group, an acryloyl group, a methacryloyl group, etc.), an alcoholic hydroxyl group, an amino group, a carboxyl group, an epoxy group, and an isocyanate group into a non-reactive organic ultraviolet absorbing agent conventionally known in the art such as salicylate series, benzophenone series, benzotriazole series, substituted acrylonitrile series, nickel-chelate series, and hindered amine series can be exemplified.

In addition, the protective layer 2 of the second embodiment may contain an acrylic resin having a glass transition temperature (Tg) of less than 100° C. in addition to the acrylic resin having a glass transition temperature (Tg) of not less than 100° C. In addition, the protective layer 2 of the second embodiment may contain two or more acrylic resins as the acrylic resin having a glass transition temperature (Tg) of not less than 100° C.

In addition, the protective layer 2 of the second embodiment preferably contains a copolymer of methyl methacrylate and styrene monomers in addition to the acrylic resin having a glass transition temperature (Tg) of not less than 100° C. According to the protective layer 2 of the second embodiment which contains a copolymer of methyl methacrylate and styrene monomers, it is possible to impart a glossy feeling to the protective layer of the second embodiment and to improve the texture of the printed article on which the transfer layer of the second embodiment has been transferred. Incidentally, the copolymer of methyl methacrylate and styrene monomers, regardless of its glass transition temperature (Tg), can impart a glossy feeling to the protective layer of the second embodiment, and with respect to the glass transition temperature (Tg), there is no particular limitation. In the copolymer of methyl methacrylate and styrene monomers, it is preferred that the copolymerization ratio of methyl methacrylate and styrene monomers is a molar ratio in the range of 5:5 to 7:3.

In addition, the protective layer 2 of the second embodiment preferably contains a copolymer of methyl methacrylate and styrene monomers in addition to the copolymer of methyl methacrylate and any monomers of acrylic acid, methacrylic acid, or 2-hydroxyethyl methacrylate as the acrylic resin having a glass transition temperature (Tg) of not less than 100° C. In this case, the content of the copolymer of methyl methacrylate and styrene monomers on the basis of the total weight of all these copolymers is preferably in the range of not less than 5% by weight to 40% by weight.

<Talc>

The protective layer transfer sheet 100 of the second embodiment has an essential condition that the protective layer 2 of the second embodiment contains talc in addition to the above mentioned acrylic resin having a glass transition temperature (Tg) of not less than 100° C.

According to the protective layer 2 of the second embodiment satisfying this condition, it is possible to improve the scratch resistance of the protective layer 2 of the second embodiment. The mechanism why the scratch resistance of the protective layer 2 of the second embodiment is improved when the protective layer 2 of the second embodiment contains talc has been not elucidated so far. However, even if the protective layer of the second embodiment contains the acrylic resin having a glass transition temperature (Tg) of not less than 100° C., it is impossible to impart sufficient scratch resistance to the protective layer in the case that talc is not contained or that particulates other than talc are contained. In addition, even if the protective layer of the second embodiment contains talc, it is impossible to impart sufficient scratch resistance to the protective layer also in the case that the acrylic resin having a glass transition temperature (Tg) of not less than 100° C. is not contained. That is, it is believed that the extremely high scratch resistance imparted to the protective layer 2 of the second embodiment is due to a synergistic effect of the acrylic resin having a glass transition temperature (Tg) of not less than 100° C. and talc. This fact would be apparent from the results of Examples and Comparative Examples described later.

In addition, the protective layer 2 of the second embodiment preferably contains talc having a specific surface area ($m^2/g$) of not more than 10. According to the protective layer 2 of the second embodiment containing the talc having a specific surface area ($m^2/g$) of not more than 10 in addition to the acrylic resin having a glass transition temperature (Tg) of not less than 100° C., it is possible to further improve the scratch resistance of the protective layer 2 of the second embodiment. Incidentally, the specific surface area of the talc is a value measured by the BET method.

In particular, the protective layer 2 of the second embodiment preferably contains talc having a specific surface area ($m^2/g$) of not more than 10 in the range of not less than 2% by weight and not more than 10% by weight on the basis of the total solid content of the resin component contained in the protective layer 2 of the second embodiment. When the content is less than 2% by weight, there may be some cases that the scratch resistance cannot be sufficiently satisfied. When the content exceeds 10% by weight, the protective layer 2 of the second embodiment becomes brittle, and there is a tendency that the plasticizer resistance becomes lower. In addition, when the content exceeds 10% by weight, there is a tendency that the glossiness of the protective layer 2 of the second embodiment becomes slightly lower. Incidentally, the resin component contained in the protective layer 2 of the second embodiment means the total weight of the above mentioned acrylic resin having a glass transition temperature (Tg) of not less than 100° C. and other resin. In the case that the protective layer 2 of the second embodiment contains no other resin, the resin component means the total weight of the acrylic resin having a glass transition temperature (Tg) of not less than 100° C.

(Other Optional Components)

The protective layer 2 of the second embodiment may contain other optional components in addition to the acrylic resin having a glass transition temperature (Tg) of not less than 100° C. and talc. For example, acrylic resins having a glass transition temperature (Tg) of less than 100° C., resin components other than acrylic resin, etc. can be enumerated. As the resin components other than the acrylic resin, "other optional components" as described in the explanation of the above mentioned transfer layer of the first embodiment, etc. can be enumerated. Other optional components may be used singly, or two or more of them can be used in combination.

In addition, the protective layer 2 of the second embodiment may contain a dispersant. In other words, the protective layer 2 of the second embodiment may be a layer formed with a coating liquid for protective layer which contains an acrylic resin having a glass transition temperature (Tg) of not less than 100° C., talc, and a dispersant.

Depending on the content of talc, the protective layer 2 of the second embodiment becomes brittle, and there is a tendency that the plasticizer resistance becomes lower. However, according to the protective layer 2 of the second embodiment containing a dispersant, it is possible to disperse talc uniformly in the protective layer 2 of the second embodiment and to prevent the plasticizer resistance from becoming lower. That is, according to the protective layer 2 of the second embodiment containing a dispersant in addition to talc, a further improvement in the scratch resistance can be expected while good plasticizer resistance is provided.

With respect to the dispersant, there is no particular limitation, and conventionally known dispersants can be used by selecting appropriately. As the dispersant, it is possible to use a commercially available product, and, for example, it is possible to use BYK series (BYK 111, 102, 180, and 142) manufactured by BYK-Chemie Japan, etc. As one example of the preferable dispersant, for example, alkylol ammonium salts, etc. can be enumerated. With respect to the content of the dispersant, there is no particular limitation, and the content is about 1% by weight on the basis of the total solid content of the talc contained in the protective layer 2 of the second embodiment.

With respect to the method for forming the protective layer 2 of the second embodiment, there is no particular limitation. The protective layer 2 can be formed by preparing a coating liquid for protective layer where optional components such as dispersant, etc. in addition to the essential components, the acrylic resin having a glass transition temperature (Tg) of not less than 100° C. and talc, are dissolved or dispersed in an appropriate solvent, coating the substrate 1 or a layer optionally provided on the substrate 1 with this coating liquid for protective layer in accordance with a known coating procedure such as the gravure printing method, the screen printing method, and the reverse roll coating printing method using a gravure plate, and then drying the coating solution.

With respect to the thickness of the protective layer 2 of the second embodiment, there is no particular limitation, and the thickness is preferably in the range of not less than 0.5 μm and not more than 10 μm.

As shown in FIG. 2, an adhesive layer 4 may be provided on the protective layer 2 of the second embodiment. In addition, a primer layer 3 may be provided between the protective layer 2 of the second embodiment and the adhesive layer 4. In addition, a plasticizer resistive layer (not shown) may be provided between the protective layer 2 of the second embodiment and the adhesive layer 4. The adhesive layer 4, the primer layer 3, and the plasticizer resistive layer are optional components in the protective layer transfer sheet of the second embodiment.

As the adhesive layer 4, the primer layer 3, and the plasticizer resistive layer, those described in the explanation of the transfer layer of the first embodiment mentioned above can be used as-is, provided that, in the above mentioned transfer layer of the first embodiment, the words "the protective layer 2 of the first embodiment" is replaced with the words "the protective layer 2 of the second embodiment".

In addition, similarly to the protective layer transfer sheet of the first embodiment, a release layer may be provided between the substrate 1 and the transfer layer 10 of the second embodiment for the purpose of improving the transferability of the transfer layer of the second embodiment.

(Transfer Layer of the Third Embodiment)

The transfer layer of the third embodiment includes a protective layer as an essential layer, similarly to the above mentioned transfer layer of the second embodiment. Hereinafter, the protective layer constituting the transfer layer 10 of the third embodiment will be referred to as "the protective layer of the third embodiment". The transfer layer 10 of the third embodiment may take a single layer structure consisting only of the protective layer 2 of the third embodiment, as shown in FIG. 1, or may take multi-layered structure in which two or more layers including the protective layer 2 of the third embodiment are layered such that the protective layer 2 of the third embodiment will be nearest the substrate 1, as shown in FIG. 2.

The protective layer of the third embodiment is a protective layer having the features of both the protective layer of the first embodiment and the protective layer of the second embodiment described above. Concretely, the protective layer of the third embodiment is characterized of containing the "specific releasing agent" as described in the explanation of the protective layer of the first embodiment in addition to the acrylic resin having a glass transition temperature (Tg) of not less than 100° C. and talc as described in the explanation of the protective layer of the second embodiment or containing the binder resin and the "specific releasing agent" as described in the explanation of the protective layer of the first embodiment in addition to the talc as described in the explanation of the protective layer of the second embodiment. A particularly preferred protective layer of the third embodiment contains the acrylic resin having a glass transition temperature (Tg) of not less than 100° C., talc, and the above mentioned "specific releasing agent".

According to the protective layer transfer sheet which comprises the protective layer of the third embodiment having the above mentioned features, even in the case that thermal energy applied on transfer of the transfer layer is increased, it is possible to prevent occurrence of fusion between the receiving layer and the transfer layer and occurrence of peeling traces when the transfer layer is peeled from the receiving layer and to obtain a high quality printed article. In addition, it is possible to impart extremely good scratch resistance and plasticizer resistance to the surface of a printed article. In addition, it is possible to impart high glossiness to a printed article formed by transferring the transfer layer thereon.

That is, the protective layer transfer sheet including the protective layer of the third embodiment can be a protective layer transfer sheet more preferable than the protective layer transfer sheet of the first embodiment and the protective layer transfer sheet of the second embodiment mentioned above, from the viewpoint of being capable of exerting effects of both the protective layer of the first embodiment and the protective layer of the second embodiment mentioned above.

With respect to the transfer layer of the third embodiment, except for including the protective layer of the first embodiment or the protective layer of the second embodiment as the protective layer of the third embodiment mentioned above, various components as described in the explanation of the transfer layer of the first embodiment and the transfer layer of the second embodiment can be used by selecting appropriately.

As (1) the acrylic resin having a glass transition temperature (Tg) of not less than 100° C. or the binder resin, (2) talc, and (3) the "specific releasing agent" which are contained in the protective layer of the third embodiment, those described in the explanation of the protective layer of the first embodiment and the protective layer of the second embodiment mentioned above can be used as-is. In addition, the preferred content, etc. are as described in the explanation of the protective layer of the first embodiment and the protective layer of the second embodiment mentioned above. For example, the protective layer of the third embodiment preferably contains talc in the range of not less than 2% by weight and not more than 10% by weight on the basis of the total weight of the resin component comprising the acrylic resin having a glass transition temperature (Tg) of not less than 100° C. In addition, when the solid content of the resin component comprising the acrylic resin having a glass transition temperature (Tg) of not less than 100° C. is taken as 100% by weight, the "specific releasing agent" is preferably contained in the range of not less than 0.5% by weight and not more than 10% by weight. In addition, the contents of the binder resin as described in the explanation of the protective layer of the first embodiment mentioned above and the acrylic resin having a glass transition temperature (Tg) of not less than 100° C. as described in the explanation of the protective layer of the second embodiment are preferably not less than 50% by weight on the basis of the total solid content of the third protective layer.

(Back Face Layer)

As shown in FIGS. 1 and 2, a back face layer 5 may be provided on a surface of the substrate 1 which is different from the surface on which the protective layer 2 is provided, in order to improve the heat resistance, the driving stability to a thermal head on printing, etc. Incidentally, the back face layer 5 is an optional component in the protective layer transfer sheet 10 according to one embodiment.

The back face layer 5 can be formed by selecting any conventionally known thermoplastic resin as appropriate. As such a thermoplastic resin, for instance, polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl butyral resins, and polyvinyl acetal resins such as polyvinyl acetoacetal resins, and silicone-modified forms of these thermoplastic resins, etc. may be enumerated. Among them, from the viewpoint of heat resistance, a polyamide-imide type resin or its silicone-modified form, etc. can be preferably used.

Furthermore, the back face layer 5 preferably contains various additives, such as, a releasing agent such as waxes, higher fatty acid amides, phosphoric acid ester compounds, metal soaps, silicone oils, surfactants, an organic powder such as fluorine-contained resin powders, and/or an inorganic particles such as silica, clay, talc, calcium carbonate, in addition to the above mentioned thermoplastic resin, for the purpose of improving the slipping property. Particularly, it is preferable to contain at least one of phosphoric acid ester compounds or metal soaps.

The back face layer 5 can be formed by preparing a coating liquid for back face layer where one or more of the thermoplastic resin as mentioned above, and optionally, any additives as necessary, are dispersed or dissolved in an appropriate solvent, coating the substrate 1 with the coating liquid by a known coating procedure such as the gravure printing method, the screen printing method, the reverse roll coating printing method using a gravure plate, and then drying the coated solution. From the viewpoint of improvement of heat resistance, etc., the thickness of the back face layer 5 is preferably from about 0.1 μm to about 5 μm, more preferably from about 0.3 μm to about 2 μm.

Figure 3:
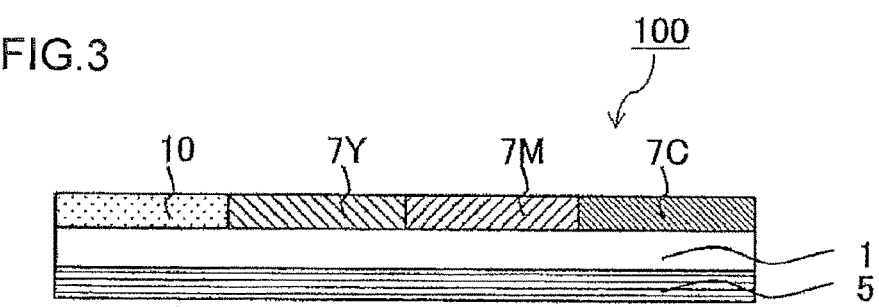
FIG. 3 is a schematic sectional view showing an example of the protective layer transfer sheet according to the present invention.

As described above, the protective layer transfer sheet 100 of the present invention has been explained. However, without deviating from the scope and the spirit of the present invention, the protective layer transfer sheet of the present invention can take various embodiments. For example, as shown in FIG. 3, the protective layer transfer sheet can be also constructed as a dye layers' integral type protective layer transfer sheet, wherein dye layers are provided on the same surface of the substrate 1 as the transfer layer 10 of the first embodiment or the transfer layer of the second embodiment is provided on, so as to the dye layers are layered in parallel on the substrate across the surface of the substrate, as being frame sequentially. Incidentally, the dye layers may be a single kind of dye layer, or for example, may take a construction, where a yellow dye layer 7Y, a magenta dye layer 7M, and a cyan dye layer 7C are provided in this order as being frame sequentially.

EXAMPLES

Next, the present invention will be described more concretely with demonstrating Examples and Comparative Examples. Hereinafter, unless otherwise specified, the expressions of "part(s)" and "%" mean those by weight.

Example 1

As a substrate, a polyethylene terephthalate film having a thickness of 5 μm was used. To one surface of the substrate, a coating liquid for protective layer 1 having the following composition was applied to achieve an amount coated in the dried state of 0.1 g/m² to form a protective layer. After that, to the protective layer, a coating liquid for primer layer having the following composition was applied to achieve an amount coated in the dried state of 0.1 g/m² to form a primer layer. After that, to the primer layer, a coating liquid for adhesive layer was applied to achieve an amount coated in the dried state of 0.1 g/m² and dried to form an adhesive layer. In addition, to the other surface of the substrate, a coating liquid for back face layer having the following composition was applied to achieve an amount coated in the dried state of 0.5 g/m² to form a back face layer, and a protective layer transfer sheet of Example 1 was obtained.

| <Coating liquid for protective layer 1> | |
|---|---|
| acrylic resin (BR-52, manufactured by Mitsubishi Rayon Co., Ltd.) | 5.965 parts |
| acrylic resin (BR-87, manufactured by Mitsubishi Rayon Co., Ltd.) | 13.919 parts |
| polyester resin (V220, manufactured by TOYOBO Co., Ltd.) | 0.06 parts |
| phosphoric acid ester (A208N, manufactured by DKS Co. Ltd.) | 0.199 parts |
| methyl ethyl ketone | 79.857 parts |

| <Coating liquid for primer layer> | |
|---|---|
| alumina sol (average primary particle diameter 10 × 100 nm) (ALUMINASOL 200 (solid content 10%), manufactured by Nissan Chemical Industries, Ltd.) | 30 parts |
| polyvinylpyrrolidone resin (K-90, manufactured by ISP Technologies Inc.) | 3 parts |
| water | 50 parts |
| isopropyl alcohol | 17 parts |

| <Coating liquid for adhesive layer> | |
| --- | --- |
| polyester resin | 20 parts |
| (VYLON 200, manufactured by TOYOBO Co., Ltd.) | |
| ultraviolet absorbing agent copolymer resin | 10 parts |
| (UVA-635L, manufactured by BASF Ltd.) | |
| methyl ethyl ketone/toluene (weight ratio 1:1) | 80 parts |

| <Coating liquid for back face layer> | |
| --- | --- |
| polyvinyl butyral resin | 13.6 parts |
| (S-LEC BX-1, manufactured by SEKISUI CHEMICAL CO., LTD.) | |
| polyisocyanate curing agent | 0.6 parts |
| (TAKENATE D218, manufactured by Takeda Pharmaceutical Company Limited) | |
| phosphoric acid ester | 0.8 parts |
| (PLYSURF A208S, manufactured by DKS Co. Ltd.) | |
| methyl ethyl ketone | 42.5 parts |
| toluene | 42.5 parts |

Example 2

The same procedure as described in Example 1 was repeated, except for using a coating liquid for protective layer 2, in which 0.199 parts of phosphoric acid ester (A208N, manufactured by DKS Co. Ltd.) of the coating liquid for protective layer 1 has been replaced with 0.199 parts of phosphoric acid ester (GD-19R, manufactured by SENKA corporation), instead of the coating liquid for protective layer 1, to thereby obtain a protective layer transfer sheet of Example 2.

Example 3

The same procedure as described in Example 1 was repeated, except for using a coating liquid for protective layer 3, in which 0.199 parts of phosphoric acid ester (A208N, manufactured by DKS Co. Ltd.) of the coating liquid for protective layer 1 has been replaced with 0.199 parts of olefin-maleic acid copolymer (number average molecular weight of from 12000 to 20000) (GD-70SR, manufactured by SENKA corporation), instead of the coating liquid for protective layer 1, to thereby obtain a protective layer transfer sheet of Example 3.

Example 4

The same procedure as described in Example 1 was repeated, except for using a coating liquid for protective layer 4, in which 0.199 parts of phosphoric acid ester (A208N, manufactured by DKS Co. Ltd.) of the coating liquid for protective layer 1 has been replaced with 0.199 parts of amino polyether-modified silicone (X-22-3939A, manufactured by Shin-Etsu Chemical Co., Ltd.), instead of the coating liquid for protective layer 1, to thereby obtain a protective layer transfer sheet of Example 4.

Example 5

The same procedure as described in Example 1 was repeated, except for using a coating liquid for protective layer 5 having the following composition, instead of the coating liquid for protective layer 1, to thereby obtain a protective layer transfer sheet of Example 5.

| <Coating liquid for protective layer 5> | |
| --- | --- |
| acrylic resin | 5.856 parts |
| (BR-52, manufactured by Mitsubishi Rayon Co., Ltd.) | |
| acrylic resin | 13.664 parts |
| (BR-87, manufactured by Mitsubishi Rayon Co., Ltd.) | |
| polyester resin | 0.057 parts |
| (V220, manufactured by TOYOBO Co., Ltd.) | |
| amino polyether-modified silicone | 0.567 parts |
| (X-22-3939A, manufactured by Shin-Etsu Chemical Co., Ltd.) | |
| methyl ethyl ketone | 79.856 parts |

Example 6

The same procedure as described in Example 1 was repeated, except for using a coating liquid for protective layer 6, in which 0.567 parts of amino polyether-modified silicone (X-22-3939A, manufactured by Shin-Etsu Chemical Co., Ltd.) of the coating liquid for protective layer 5 has been replaced with 0.567 parts of phosphoric acid ester (A208N, manufactured by DKS Co. Ltd.), instead of the coating liquid for protective layer 1, to thereby obtain a protective layer transfer sheet of Example 6.

Example 7

The same procedure as described in Example 1 was repeated, except for using a coating liquid for protective layer 7 having the following composition, instead of the coating liquid for protective layer 1, to thereby obtain a protective layer transfer sheet of Example 7.

| <Coating liquid for protective layer 7> | |
| --- | --- |
| acrylic resin | 5.478 parts |
| (BR-52, manufactured by Mitsubishi Rayon Co., Ltd.) | |
| acrylic resin | 12.782 parts |
| (BR-87, manufactured by Mitsubishi Rayon Co., Ltd.) | |
| polyester resin | 0.054 parts |
| (V220, manufactured by TOYOBO Co., Ltd.) | |
| phosphoric acid ester | 1.826 parts |
| (A208N, manufactured by DKS Co. Ltd.) | |
| methyl ethyl ketone | 79.861 parts |

Example 8

The same procedure as described in Example 1 was repeated, except for using a coating liquid for protective layer 8 having the following composition, instead of the coating liquid for protective layer 1, to thereby obtain a protective layer transfer sheet of Example 8.

| <Coating liquid for protective layer 8> | |
| --- | --- |
| acrylic resin | 100 parts |
| (BR-87, manufactured by Mitsubishi Rayon Co., Ltd.) | |
| phosphoric acid ester | 1 part |
| (A208N, manufactured by DKS Co. Ltd.) | |
| methyl ethyl ketone | 404 parts |

Comparative Example 1

The same procedure as described in Example 1 was repeated, except for replacing the coating liquid for protective layer 1 with a coating liquid for protective layer A having the following composition to thereby obtain a protective layer transfer sheet of Comparative Example 1.

| <Coating liquid for protective layer A> | |
|---|---|
| acrylic resin (BR-52, manufactured by Mitsubishi Rayon Co., Ltd.) | 6.023 parts |
| acrylic resin (BR-87, manufactured by Mitsubishi Rayon Co., Ltd.) | 14.053 parts |
| polyester resin (V220, manufactured by TOYOBO Co., Ltd.) | 0.061 parts |
| MEK | 79.863 parts |

Comparative Example 2

The same procedure as described in Example 1 was repeated, except for using a coating liquid for protective layer B, in which 0.567 parts of amino polyether-modified silicone (X-22-3939A, manufactured by Shin-Etsu Chemical Co., Ltd.) of the coating liquid for protective layer 5 has been replaced with 0.567 parts of amino-modified (side chain phenyl) silicone (X-22-1660B-3, manufactured by Shin-Etsu Chemical Co., Ltd.), instead of the coating liquid for protective layer 1, to thereby obtain a protective layer transfer sheet of Comparative Example 2.

Comparative Example 3

The same procedure as described in Example 1 was repeated, except for using a coating liquid for protective layer C, in which 0.567 parts of amino polyether-modified silicone (X-22-3939A, manufactured by Shin-Etsu Chemical Co., Ltd.) of the coating liquid for protective layer 5 has been replaced with 0.567 parts of long chain alkyl-modified silicone (KF-412, manufactured by Shin-Etsu Chemical Co., Ltd.), instead of the coating liquid for protective layer 1, to thereby obtain a protective layer transfer sheet of Comparative Example 3.

Comparative Example 4

The same procedure as described in Example 1 was repeated, except for using a coating liquid for protective layer D, in which 0.567 parts of amino polyether-modified silicone (X-22-3939A, manufactured by Shin-Etsu Chemical Co., Ltd.) of the coating liquid for protective layer 5 has been replaced with 0.567 parts of aralkyl-modified silicone (KF-410, manufactured by Shin-Etsu Chemical Co., Ltd.), instead of the coating liquid for protective layer 1, to thereby obtain a protective layer transfer sheet of Comparative Example 4.

(Formation of Printed Article)

Using the following thermal printer 1, a black solid image which consists of yellow, magenta, and cyan dyes was printed onto the receiving layer of a thermal transfer receiving sheet prepared in accordance with the following method to obtain a printed article. As the yellow, magenta, and cyan dyes, a thermal transfer sheet prepared in accordance with the following method was used.

(Preparation of Thermal Transfer Receiving Sheet)

On a porous film layer comprising a porous polyethylene film (TOYOPEARL-SSP4255, manufactured by TOYOBO Co., Ltd., thickness of 35 μm), a coating liquid for intermediate layer and a coating liquid for receiving layer having the following composition were applied in this order by the gravure reverse coating method and dried to form an intermediate layer and a receiving layer. On a surface of the porous polyethylene film which is opposite to the surface on which the intermediate layer and the receiving layer have been provided, a coating liquid for adhesive layer having the following composition was applied and dried by the three reverse roller coating method to form an adhesive layer, which was bonded onto RC paper (155 g/m$^2$, thickness of 151 μm, manufactured by Mitsubishi Paper Mills Ltd.) to prepare a thermal transfer receiving sheet. The amount coated on the intermediate layer was 1.5 g/m$^2$, the amount coated on the receiving layer was 5.0 g/m$^2$, and the amount coated on the adhesive layer was 5.0 g/m$^2$, all in the dried state.

| (Coating liquid for intermediate layer) | |
|---|---|
| polyester resin (POLYESTER WR-905, manufactured by The Nippon Synthetic Chemical Industry Co., Ltd.) | 50 parts |
| titanium oxide (TCA888, manufactured by Tohkem Products Corporation) | 20 parts |
| fluorescent whitening agent (Uvitex BAC, manufactured by Ciba Specialty Chemicals Inc.) | 1.2 parts |
| water/isopropyl alcohol = 1:1 | 28.8 parts |

| (Coating liquid for receiving layer) | |
|---|---|
| vinyl chloride - vinyl acetate copolymer (SOLBIN C, manufactured by Nissin Chemical Industry Co., Ltd.) | 60 parts |
| epoxy-modified silicone (X-22-3000T, manufactured by Shin-Etsu Chemical Co., Ltd.) | 1.2 parts |
| methyl styl-modified silicone (X-24-510, manufactured by Shin-Etsu Chemical Co., Ltd.) | 0.6 parts |
| methyl ethyl ketone/toluene (weight ratio 1:1) | 5 parts |

| (Coating liquid for adhesive layer) | |
|---|---|
| urethane resin (TAKELAC A-969V, MITSUI TAKEDA CHEMICALS, INC.) | 30 parts |
| isocyanate (TAKENATE A-5, MITSUI TAKEDA CHEMICALS, INC.) | 10 parts |
| ethyl acetate | 100 parts |

(Preparation of Thermal Transfer Sheet)

As a substrate, a polyethylene terephthalate film which underwent easy-adhesive treatment in advance, and had a thickness of 4.5 μm was used. On this substrate, a coating liquid for heat-resistant slipping layer having the following composition was applied so as to achieve an amount of 0.8 g/m$^2$ in the dried state to form a heat-resistant slipping layer. After that, onto the other surface of the substrate, each of a coating liquid for the yellow dye layer, a coating liquid for the magenta dye layer, and a coating liquid for the cyan dye layer was applied as being frame sequentially so as to achieve the amount coated in the dried state of 0.6 g/m$^2$ to form a dye layer to thereby obtain a thermal transfer sheet.

| (Coating liquid for heat resistant slipping layer) | |
|---|---|
| polyvinyl acetal resin (hydroxyl value 12% by weight) (S-LEC KS-1, manufactured by SEKISUI CHEMICAL CO., LTD.) | 60.8 parts |
| polyisocyanate (NCO = 17.3% by weight) (BURNOCK D750, manufactured by DIC Corporation) | 4.2 parts |

-continued

| (Coating liquid for heat resistant slipping layer) | |
|---|---|
| filler (zinc stearyl phosphate) (LBT1830 purified, manufactured by SAKAI CHEMICAL INDUSTRY CO., LTD.) | 10 parts |
| filler (zinc stearate) (SZ-PF, manufactured by SAKAI CHEMICAL INDUSTRY CO., LTD.) | 10 parts |
| filler (polyethylene wax) (POLYWAX 3000, manufactured by TOYO ADL CORPORATION) | 3 parts |
| filler (ethoxylated alcohol-modified wax) (UNITHOX 750, manufactured by TOYO ADL CORPORATION) | 7 parts |
| toluene | 200 parts |
| methyl ethyl ketone | 100 parts |

| (Coating liquid for yellow dye layer) | |
|---|---|
| Disperse Yellow 201 | 4.0 parts |
| polyvinyl acetal resin (S-LEC KS-5, manufactured by SEKISUI CHEMICAL CO., LTD.) | 3.5 parts |
| polyethylene wax | 0.1 parts |
| methyl ethyl ketone | 45.0 parts |
| toluene | 45.0 parts |

| (Coating liquid for magenta dye layer) | |
|---|---|
| Disperse Red 60 | 1.5 parts |
| Disperse Violet 26 | 2.0 parts |
| polyvinyl acetal resin (S-LEC KS-5, manufactured by SEKISUI CHEMICAL CO., LTD.) | 4.5 parts |
| polyethylene wax | 0.1 parts |
| methyl ethyl ketone | 45.0 parts |
| toluene | 45.0 parts |

| (Coating liquid for cyan dye layer) | |
|---|---|
| Solvent Blue 63 | 2.0 parts |
| Disperse Blue 354 | 2.0 parts |
| polyvinyl acetal resin (S-LEC KS-5, manufactured by SEKISUI CHEMICAL CO., LTD.) | 3.5 parts |
| polyethylene wax | 0.1 parts |
| methyl ethyl ketone | 45.0 parts |
| toluene | 45.0 parts |

<Thermal Printer 1>

Gradation control system; a multi-pulse type thermal head in which the number of divided pulses with a pulse length obtained by equally dividing one line period into 256 parts is variable from 0 to 255; KEE-57-12GAN2-STA (manufactured by KYOCERA Corporation)
Average resistance value of heating element; 3303(Ω)
Print density in scanning direction; 300 dpi
Print density in feed direction; 300 dpi
Printing voltage; 22.5 (V)
One line period; 3.0 (msec.)
Printing initiation temperature; 35 (° C.)
Pulse duty; 85%
(Evaluation for Adhesion)

By use of the protective layer transfer sheet of each Examples and Comparative Examples, and under the following conditions, the protective layer was transferred onto the receiving layer of the printed article obtained in the formation of printed article described above using the following thermal printer 2 by increasing the printing voltage from 16.6 V to 17.7 V, and to 18.9 V, and to 20.7 V under the condition of 255/255 gradation to measure the voltage when adhesion between the receiving layer and the protective layer occurred. Incidentally, it is possible to obtain a printed article having a matte appearance by applying a printing voltage of not less than 16.6 V. The printing voltage value at which adhesion between the receiving layer and protective layer occurred is shown in Table 1.

<Thermal Printer 2>

Gradation control system; a multi-pulse type thermal head in which the number of divided pulses with a pulse length obtained by equally dividing one line period into 256 parts is variable from 0 to 255; KEE-57-12GAN2-STA (manufactured by KYOCERA Corporation)
Average resistance value of heating element; 3303(Ω)
Print density in scanning direction; 300 dpi
Print density in feed direction; 300 dpi
One line period; 3.0 (msec.)
Printing initiation temperature; 35 (° C.)
Pulse duty; 85%
(Evaluation for Peeling Noise)

By use of the thermal printer 2, whether a peeling noise occurred or not was checked when the printing voltage was 16.6 V under printing conditions similar to those used in the evaluation for adhesion mentioned above, and the peeling noise was evaluated under the following evaluation criteria. The evaluation test results are also shown in table 1.

<Evaluation Criteria>

○: No peeling noise occurred.
x: A peeling noise occurred.
(Evaluation for Adhesion and Rupture)

By Use of the Thermal Printer 2, Whether Rupture in the protective layer and adhesion between the receiving layer and the protective layer occurred was visually observed when the printing voltage was 16.6 V under the printing conditions similar to those used in the evaluation for adhesion mentioned above, and the adhesion and the rupture were evaluated under the following evaluation criteria. The evaluation test results are also shown in table 1.

<Evaluation Criteria>

○: No adhesion between the receiving layer and the protective layer was observed, and no rupture was observed in the protective layer.
x: Adhesion between the receiving layer and the protective layer was observed, or rupture was observed in the protective layer.
(Total Evaluation for Releasability)

⊚: At 16.6 V, no peeling noise occurred, and adhesion and rupture of protective layer were not observed.
○: At 16.6 V, a peeling noise occurred, but adhesion and rupture of the protective layer were not observed.
x: At 16.6 V, two or more of occurrence of a peeling noise, adhesion, and rupture of the protective layer were observed.
(Evaluation of Plasticizer Resistance (1))

Subsequently, in order to evaluate the relationship between the content of the "specific releasing agent" and the plasticizer resistance, evaluation of plasticizer resistance was done for a printed article formed by providing a protective layer on a receiving layer obtained as in the evaluation of peeling noise described above. With respect to the evaluation of plasticizer resistance, a soft vinyl chloride sheet containing plasticizer (ARUTORON #480 manufactured by Mitsubishi Chemical Corporation, thickness of 400 μm) was superposed on the surface of the printed article onto which the protective layer had been transferred and kept for 12 hours under an environment of 50° C. while applying a load of 24 g/cm². The deterioration state of the printed article image caused by the plasticizer was visually observed, and the plasticizer resistance of the protective layer was evaluated on the basis of the following criteria. The deterioration state of the printed article image caused by the plasticizer when kept for 24 hours under an environment of 50° C. were evaluated by the same evaluation method. The evaluation test results of the plasticizer resistance are also shown in table 1. Incidentally, the plasticizer resistance evaluation (1) was done only on the protective layer transfer sheets of Examples.

<Evaluation Criteria>

⊚: The dye did not migrate at all.
○: The dye migrated very slightly.
Δ: Although the dye migration was recognized as a certain extent, it was within the level of causing no problem in use.
x: The dye migrated in the almost entire area.

TABLE 1

|  | Releasability evaluation | | | | Plasticizer resistance evaluation (1) | |
| --- | --- | --- | --- | --- | --- | --- |
|  |  | | Adhesion | | | |
|  | Adhesion energy | Peeling noise at 16.6 V | and rupture at 16.6 V | Total evaluation | Kept for 12 hours | Kept for 24 hours |
| Example 1 | 18.9 V | ○ | ○ | ⊚ | ⊚ | ⊚ |
| Example 2 | 18.9 V | ○ | ○ | ⊚ | ⊚ | ⊚ |
| Example 3 | 18.9 V | ○ | ○ | ⊚ | ⊚ | ⊚ |
| Example 4 | 17.7 V | X | ○ | ○ | ⊚ | ⊚ |
| Example 5 | 18.9 V | ○ | ○ | ⊚ | ○ | ○ |
| Example 6 | 20.7 V | ○ | ○ | ⊚ | ○ | ○ |
| Example 7 | 20.7 V | ○ | ○ | ⊚ | Δ | X |
| Example 8 | 20.7 V | ○ | ○ | ⊚ | ○ | ○ |
| Comparative Example 1 | 16.6 V | X | X | X | — | — |
| Comparative Example 2 | 16.6 V | X | X | X | — | — |
| Comparative Example 3 | 16.6 V | X | X | X | — | — |
| Comparative Example 4 | 16.6 V | X | X | X | — | — |

Example 9

The same procedure as described in Example 1 was repeated, except for using a coating liquid for protective layer 9 having the following composition, instead of the coating liquid for protective layer 1, to thereby obtain a protective layer transfer sheet of Example 9.

| <Coating liquid for protective layer 9> | |
| --- | --- |
| acrylic resin (Tg: 105° C.) (BR-87, manufactured by Mitsubishi Rayon Co., Ltd.) | 100 parts |
| talc (specific surface area: 8 m²/g) (P-3, manufactured by NIPPON TALC Co., Ltd.) | 2 parts |
| methyl ethyl ketone | 306 parts |

Example 10

The same procedure as described in Example 1 was repeated, except for using a coating liquid for protective layer 10 having the following composition, instead of the coating liquid for protective layer 1, to thereby obtain a protective layer transfer sheet of Example 10.

| <Coating liquid for protective layer 10> | |
| --- | --- |
| acrylic resin (Tg: 105° C.) (BR-87, manufactured by Mitsubishi Rayon Co., Ltd.) | 100 parts |
| talc (specific surface area: 8 m²/g) (P-3, manufactured by NIPPON TALC Co., Ltd.) | 10 parts |
| methyl ethyl ketone | 330 parts |

Example 11

The same procedure as described in Example 1 was repeated, except for using a coating liquid for protective layer 11 having the following composition, instead of the coating liquid for protective layer 1, to thereby obtain a protective layer transfer sheet of Example 11.

| <Coating liquid for protective layer 11> | |
| --- | --- |
| acrylic resin (Tg: 105° C.) (BR-87, manufactured by Mitsubishi Rayon Co., Ltd.) | 100 parts |
| talc (specific surface area: 8 m²/g) (P-3, manufactured by NIPPON TALC Co., Ltd.) | 3 parts |
| dispersant (BYK-180, manufactured by BYK-Chemie Japan, solid content 81%) | 0.5 parts |
| methyl ethyl ketone | 310 parts |

Example 12

The same procedure as described in Example 1 was repeated, except for using a coating liquid for protective layer 12 having the following composition, instead of the coating liquid for protective layer 1, to thereby obtain a protective layer transfer sheet of Example 12.

| <Coating liquid for protective layer 12> | |
| --- | --- |
| acrylic resin (Tg: 105° C.) (BR-87, manufactured by Mitsubishi Rayon Co., Ltd.) | 60 parts |

-continued

| <Coating liquid for protective layer 12> | |
|---|---|
| styrene acrylic resin (Tg: 105° C.) (BR-52, manufactured by Mitsubishi Rayon Co., Ltd.) | 40 parts |
| talc (specific surface area: 8 m$^2$/g) (P-3, manufactured by NIPPON TALC Co., Ltd.) | 3 parts |
| dispersant (BYK-180, manufactured by BYK-Chemie Japan) | 0.5 parts |
| methyl ethyl ketone | 310 parts |

Example 13

The same procedure as described in Example 1 was repeated, except for using a coating liquid for protective layer 13 having the following composition, instead of the coating liquid for protective layer 1, to thereby obtain a protective layer transfer sheet of Example 13.

| <Coating liquid for protective layer 13> | |
|---|---|
| acrylic resin (Tg: 105° C.) (BR-87, manufactured by Mitsubishi Rayon Co., Ltd.) | 90 parts |
| styrene acrylic resin (Tg: 105° C.) (BR-52, manufactured by Mitsubishi Rayon Co., Ltd.) | 10 parts |
| talc (specific surface area: 8 m$^2$/g) (P-3, manufactured by NIPPON TALC Co., Ltd.) | 3 parts |
| dispersant (BYK-180, manufactured by BYK-Chemie Japan) | 0.5 parts |
| methyl ethyl ketone | 310 parts |

Example 14

The same procedure as described in Example 1 was repeated, except for using a coating liquid for protective layer 14 having the following composition, instead of the coating liquid for protective layer 1, to thereby obtain a protective layer transfer sheet of Example 14.

| <Coating liquid for protective layer 14> | |
|---|---|
| acrylic resin (Tg: 105° C.) (BR-87, manufactured by Mitsubishi Rayon Co., Ltd.) | 95 parts |
| styrene acrylic resin (Tg: 105° C.) (BR-52, manufactured by Mitsubishi Rayon Co., Ltd.) | 5 parts |
| talc (specific surface area: 8 m$^2$/g) (P-3, manufactured by NIPPON TALC Co., Ltd.) | 3 parts |
| dispersant (BYK-180, manufactured by BYK-Chemie Japan) | 0.5 parts |
| methyl ethyl ketone | 310 parts |

Example 15

The same procedure as described in Example 1 was repeated, except for using a coating liquid for protective layer 15 having the following composition, instead of the coating liquid for protective layer 1, to thereby obtain a protective layer transfer sheet of Example 15.

| <Coating liquid for protective layer 15> | |
|---|---|
| acrylic resin (Tg: 105° C.) (BR-87, manufactured by Mitsubishi Rayon Co., Ltd.) | 60 parts |
| styrene acrylic resin (Tg: 105° C.) (BR-52, manufactured by Mitsubishi Rayon Co., Ltd.) | 40 parts |

-continued

| <Coating liquid for protective layer 15> | |
|---|---|
| talc (specific surface area: 8 m$^2$/g) (P-3, manufactured by NIPPON TALC Co., Ltd.) | 15 parts |
| dispersant (BYK-180, manufactured by BYK-Chemie Japan) | 0.5 parts |
| methyl ethyl ketone | 310 parts |

Example 16

The same procedure as described in Example 1 was repeated, except for using a coating liquid for protective layer 16 having the following composition, instead of the coating liquid for protective layer 1, to thereby obtain a protective layer transfer sheet of Example 16.

| <Coating liquid for protective layer 16> | |
|---|---|
| acrylic resin (Tg: 105° C.) (BR-87, manufactured by Mitsubishi Rayon Co., Ltd.) | 100 parts |
| talc (specific surface area: 25 m$^2$/g) (SG100, manufactured by NIPPON TALC Co., Ltd.) | 3 parts |
| methyl ethyl ketone | 309 parts |

Comparative Example 5

The same procedure as described in Example 1 was repeated, except for using a coating liquid for protective layer E having the following composition, instead of the coating liquid for protective layer 1, to thereby obtain a protective layer transfer sheet of Comparative Example 5.

| <Coating liquid for protective layer E> | |
|---|---|
| acrylic resin (Tg: 105° C.) (BR-87, manufactured by Mitsubishi Rayon Co., Ltd.) | 100 parts |
| methyl ethyl ketone | 310 parts |

Comparative Example 6

The same procedure as described in Example 1 was repeated, except for using a coating liquid for protective layer F having the following composition, instead of the coating liquid for protective layer 1, to thereby obtain a protective layer transfer sheet of Comparative Example 6.

| <Coating liquid for protective layer F> | |
|---|---|
| acrylic resin (Tg: 105° C.) (BR-87, manufactured by Mitsubishi Rayon Co., Ltd.) | 100 parts |
| silicone resin particulates (specific surface area: 20 m$^2$/g) (Tospearl 145, manufactured by Momentive Performance Materials Japan LLC.) | 3 parts |
| methyl ethyl ketone | 309 parts |

Comparative Example 7

The same procedure as described in Example 1 was repeated, except for using a coating liquid for protective layer G having the following composition, instead of the coating liquid for protective layer 1, to thereby obtain a protective layer transfer sheet of Comparative Example 7.

| <Coating liquid for protective layer G> | |
|---|---|
| acrylic resin (Tg: 75° C.) (BR-60, manufactured by Mitsubishi Rayon Co., Ltd.) | 100 parts |
| talc (specific surface area: 8 m$^2$/g) (P-3, manufactured by NIPPON TALC Co., Ltd.) | 3 parts |
| methyl ethyl ketone | 309 parts |

Comparative Example 8

The same procedure as described in Example 1 was repeated, except for using a coating liquid for protective layer H having the following composition, instead of the coating liquid for protective layer 1, to thereby obtain a protective layer transfer sheet of Comparative Example 8.

| <Coating liquid for protective layer H> | |
|---|---|
| phenoxy type resin (Tg: 84° C.) (PKHB, manufactured by InChem Corporation) | 100 parts |
| talc (specific surface area: 8 m$^2$/g) (P-3, manufactured by NIPPON TALC Co., Ltd.) | 3 parts |
| methyl ethyl ketone | 309 parts |

(Transfer of Protective Layer)

By use of the protective layer transfer sheets of Examples 9 to 16 and Comparative Examples 5 to 8, the transfer layer including the protective layer was transferred onto the receiving layer of the printed article obtained by the formation of the printed article mentioned above using the following thermal printer 3 to achieve image forming products of Examples 9 to 16 and Comparative Examples 5 to 8 in which the transfer layer has been transferred onto the printed article such that the protective layer is located on the outermost surface.

<Thermal Printer 3>

Gradation control system; a multi-pulse type thermal head in which the number of divided pulses with a pulse length obtained by equally dividing one line period into 256 parts is variable from 0 to 255; KEE-57-12GAN2-STA (manufactured by KYOCERA Corporation)
Average resistance value of heating element; 3303(Ω)
Print density in scanning direction; 300 dpi
Print density in feed direction; 300 dpi
Printing voltage; 18 (V)
One line period; 3.0 (msec.)
Printing initiation temperature; 35 (° C.)
Pulse duty; 85%

(Evaluation of Scratch Resistance)

The surface of the protective layer of the image forming product of each Examples and Comparative Examples obtained above was superposed on sandpaper (#1200 grit). In the state that a load of 5 g/cm$^2$ was applied thereon, the sandpaper was pulled at 4000 mm/min. After that, the condition of the surface of the protective layer of the image forming product was visually observed, and the scratch resistance was evaluated on the basis of the following evaluation criteria. The evaluation test results are shown in table 2.

<Evaluation Criteria>
o: Scratches were unnoticeable.
Δ: Although fine scratches were observed, it was within the level of causing no problem in use.
x: Scratches were noticeable.

(Evaluation of Plasticizer Resistance (2))

A soft vinyl chloride sheet containing plasticizer (ARUTORON #480 manufactured by Mitsubishi Chemical Corporation, thickness of 400 μm) was superposed on the surface of the image forming product onto which the protective layer had been transferred and kept for 24 hours under an environment of 50° C. in the state that a 1-kg weight was placed thereon. The deterioration state of the printed article image caused by the plasticizer was visually observed, and the plasticizer resistance of the protective layer was evaluated on the basis of the following criteria. The evaluation test results of the plasticizer resistance are also shown in table 2.

<Evaluation Criteria>
o: No removal of the image by the plasticizer was observed.
Δ: Although slight removal of the image was observed, it was within the level of causing no problem in use.
x: Removal of the image by the plasticizer was observed.

(Glossiness Evaluation)

The glossiness of the image forming product of each Examples and Comparative Examples obtained by transfer of the protective layer mentioned above were measured using Gloss Meter VG2000 (manufactured by NIPPON DENSHOKU INDUSTRIES CO., LTD.) at a reflection angle of 20°, and the glossiness was evaluated on the basis of the following evaluation criteria. The evaluation test results are also shown in table 2.

<Evaluation Criteria>
⊚: The glossiness was not less than 50°.
o: The glossiness was not less than 40° and less than 50°.
Δ: The glossiness was not less than 35° and less than 40°.
x: The glossiness was less than 35°.

TABLE 2

| | Scratch resistance evaluation | Plasticizer resistance evaluation (2) | Glossiness evaluation |
|---|---|---|---|
| Example 9 | o | o | o |
| Example 10 | o | o | o |
| Example 11 | o | o | o |
| Example 12 | o | o | ⊚ |
| Example 13 | o | o | ⊚ |
| Example 14 | o | o | o |
| Example 15 | o | Δ | o |
| Example 16 | Δ | o | o |
| Comparative Example 5 | x | o | o |
| Comparative Example 6 | x | o | o |
| Comparative Example 7 | x | o | o |
| Comparative Example 8 | x | o | o |

Example 17

The same procedure as described in Example 1 was repeated, except for using a coating liquid for protective layer 17 having the following composition, instead of the coating liquid for protective layer 1, to thereby obtain a protective layer transfer sheet of Example 17.

| <Coating liquid for protective layer 17> | |
|---|---|
| acrylic resin (Tg: 105° C.) (BR-87, manufactured by Mitsubishi Rayon Co., Ltd.) | 100 parts |

| <Coating liquid for protective layer 17> | |
|---|---|
| talc (specific surface area: 8 m²/g) (P-3, manufactured by NIPPON TALC Co., Ltd.) | 2 parts |
| phosphoric acid ester (PLYSURF A208S, manufactured by DKS Co. Ltd.) | 1 part |
| methyl ethyl ketone | 206 parts |
| toluene | 206 parts |

Example 18

The same procedure as described in Example 1 was repeated, except for using a coating liquid for protective layer 18, in which 1 part of phosphoric acid ester (A208N, manufactured by DKS Co. Ltd.) of the coating liquid for protective layer 17 has been replaced with 1 part of phosphoric acid ester (GD-19R, manufactured by SENKA corporation), instead of the coating liquid for protective layer 1, to thereby obtain a protective layer transfer sheet of Example 18.

Example 19

The same procedure as described in Example 1 was repeated, except for using a coating liquid for protective layer 19, in which 1 part of phosphoric acid ester (A208N, manufactured by DKS Co. Ltd.) of the coating liquid for protective layer 17 has been replaced with 1 part of olefin-maleic acid copolymer (number average molecular weight of from 12000 to 20000) (GD-70SR, manufactured by SENKA corporation), instead of the coating liquid for protective layer 1, to thereby obtain a protective layer transfer sheet of Example 19.

Example 20

The same procedure as described in Example 1 was repeated, except for using a coating liquid for protective layer 20, in which 1 part of phosphoric acid ester (A208N, manufactured by DKS Co. Ltd.) of the coating liquid for protective layer 17 has been replaced with 1 part of amino polyether-modified silicone (X-22-3939A, manufactured by Shin-Etsu Chemical Co., Ltd.), instead of the coating liquid for protective layer 1, to thereby obtain a protective layer transfer sheet of Example 20.

Example 21

The same procedure as described in Example 1 was repeated, except for using a coating liquid for protective layer 21 having the following composition, instead of the coating liquid for protective layer 1, to thereby obtain a protective layer transfer sheet of Example 21.

| <Coating liquid for protective layer 21> | |
|---|---|
| acrylic resin (Tg: 105° C.) (BR-87, manufactured by Mitsubishi Rayon Co., Ltd.) | 60 parts |
| styrene acrylic resin (Tg: 105° C.) (BR-52, manufactured by Mitsubishi Rayon Co., Ltd.) | 40 parts |
| talc (specific surface area: 8 m²/g) (P-3, manufactured by NIPPON TALC Co., Ltd.) | 3 parts |
| phosphoric acid ester (PLYSURF A208S, manufactured by DKS Co. Ltd.) | 1 part |

| <Coating liquid for protective layer 21> | |
|---|---|
| dispersant (BYK-180, manufactured by BYK-Chemie Japan) | 0.5 parts |
| methyl ethyl ketone | 310 parts |

Example 22

The same procedure as described in Example 1 was repeated, except for using a coating liquid for protective layer 22, in which 1 part of phosphoric acid ester (A208N, manufactured by DKS Co. Ltd.) of the coating liquid for protective layer 21 has been replaced with 1 part of phosphoric acid ester (GD-19R, manufactured by SENKA corporation), instead of the coating liquid for protective layer 1, to thereby obtain a protective layer transfer sheet of Example 22.

Example 23

The same procedure as described in Example 1 was repeated, except for using a coating liquid for protective layer 23, in which 1 part of phosphoric acid ester (A208N, manufactured by DKS Co. Ltd.) of the coating liquid for protective layer 21 has been replaced with 1 part of olefin-maleic acid copolymer (number average molecular weight of from 12000 to 20000) (GD-70SR, manufactured by SENKA corporation), instead of the coating liquid for protective layer 1, to thereby obtain a protective layer transfer sheet of Example 23.

Example 24

The same procedure as described in Example 1 was repeated, except for using a coating liquid for protective layer 24, in which 1 part of phosphoric acid ester (A208N, manufactured by DKS Co. Ltd.) of the coating liquid for protective layer 21 has been replaced with 1 part of amino polyether-modified silicone (X-22-3939A, manufactured by Shin-Etsu Chemical Co., Ltd.), instead of the coating liquid for protective layer 1, to thereby obtain a protective layer transfer sheet of Example 24.

(Transfer of Protective Layer)

By use of the protective layer transfer sheets of Examples 17 to 24, the transfer layer including the protective layer was transferred onto the receiving layer of the printed article obtained by the formation of printed article mentioned above using the following thermal printer 3 to achieve image forming products of Examples 17 to 24 in which the transfer layer has been transferred onto the printed article such that the protective layer is located on the outermost surface.

On the image forming products of Examples 17 to 24, the scratch resistance, the plasticizer resistance (2), and the glossiness was evaluated by the same method as described in the explanation of Examples 9 to 16 and Comparative Examples 5 to 8 mentioned above. The evaluation test results are shown in table 3.

By use of the protective layer transfer sheets of Examples 17 to 24, the releasability was evaluated as described in the explanation of Examples 1 to 8 and Comparative Examples 1 to 4 mentioned above. The evaluation test results are also shown in table 3.

TABLE 3

| | Scratch resistance evaluation | Plasticizer resistance evaluation (2) | Glossiness evaluation | Adhesion energy | Releasability evaluation | | Total evaluation |
|---|---|---|---|---|---|---|---|
| | | | | | Peeling noise at 16.6 V | Adhesion and rupture at 16.6 V | |
| Example 17 | ○ | ○ | ○ | 18.9 V | ○ | ○ | ⊚ |
| Example 18 | ○ | ○ | ○ | 18.9 V | ○ | ○ | ⊚ |
| Example 19 | ○ | ○ | ○ | 18.9 V | ○ | ○ | ⊚ |
| Example 20 | ○ | ○ | ○ | 17.7 V | X | ○ | ○ |
| Example 21 | ○ | ○ | ⊚ | 18.9 V | ○ | ○ | ⊚ |
| Example 22 | ○ | ○ | ⊚ | 18.9 V | ○ | ○ | ⊚ |
| Example 23 | ○ | ○ | ⊚ | 18.9 V | ○ | ○ | ⊚ |
| Example 24 | ○ | ○ | ⊚ | 17.7 V | X | ○ | ○ |

REFERENCE SIGNS LIST

100 . . . protective layer transfer sheet
1 . . . substrate
2 . . . protective layer
3 . . . adhesive layer
5 . . . back face layer
10 . . . transfer layer

The invention claimed is:

1. A protective layer transfer sheet comprising a substrate, and a transfer layer provided on a surface of the substrate, wherein the transfer layer comprises a binder resin and amino polyether-modified silicone oils.

2. The protective layer transfer sheet according to claim 1, wherein the transfer layer comprises amino polyether-modified silicone oils in the range of not less than 0.5% by weight and not more than 10% by weight on the basis of the total weight of the solid content of the binder resin.

3. The protective layer transfer sheet according to claim 2, wherein the transfer layer has a multi-layered structure, and wherein a layer which is nearest the substrate among layers constituting the transfer layer comprises the binder resin and amino polyether-modified silicone oils.

4. The protective layer transfer sheet according to claim 3, wherein the multi-layered structure includes a protective layer and an adhesive layer layered in this order, and wherein the layer which is nearest the substrate is the protective layer.

5. The protective layer transfer sheet according to claim 1, wherein the transfer layer has a multi-layered structure, and wherein a layer which is nearest the substrate among layers constituting the transfer layer comprises the binder resin and amino polyether-modified silicone oils.

6. The protective layer transfer sheet according to claim 5, wherein the multi-layered structure includes a protective layer and an adhesive layer layered in this order, and wherein the layer which is nearest the substrate is the protective layer.

* * * * *